(12) United States Patent
Nakamura

(10) Patent No.: US 10,459,668 B2
(45) Date of Patent: Oct. 29, 2019

(54) PRINT CONTROL DEVICE, PRINTING SYSTEM, AND PRINT CONTROL METHOD FOR GENERATING IMAGE PRINT COMMANDS FROM PRINT DATA IN MARKUP LANGUAGE

(71) Applicant: SEIKO EPSON CORPORATION, Tokyo (JP)

(72) Inventor: Hideo Nakamura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/029,183

(22) Filed: Jul. 6, 2018

(65) Prior Publication Data

US 2019/0004746 A1    Jan. 3, 2019

Related U.S. Application Data

(63) Continuation of application No. 14/384,364, filed as application No. PCT/JP2013/060141 on Mar. 27, 2013, now Pat. No. 10,019,204.

(30) Foreign Application Priority Data

| Mar. 30, 2012 | (JP) | 2012-081321 |
| Mar. 30, 2012 | (JP) | 2012-081330 |
| Apr. 3, 2012 | (JP) | 2012-084630 |
| Apr. 3, 2012 | (JP) | 2012-084631 |

(51) Int. Cl.
*G06F 3/12* (2006.01)

(52) U.S. Cl.
CPC ............ *G06F 3/1205* (2013.01); *G06F 3/124* (2013.01); *G06F 3/1207* (2013.01); *G06F 3/1209* (2013.01); *G06F 3/1215* (2013.01); *G06F 3/1246* (2013.01); *G06F 3/1247* (2013.01); *G06F 3/1254* (2013.01); *G06F 3/1259* (2013.01); *G06F 3/1288* (2013.01); *G06F 3/1206* (2013.01); *G06F 3/1228* (2013.01)

(58) Field of Classification Search
None
See application file for complete search history.

(56) References Cited

U.S. PATENT DOCUMENTS

| 5,382,968 A | 1/1995 | Endoh |
| 5,822,499 A | 10/1998 | Okada et al. |
| 6,070,000 A | 5/2000 | Mori |
| 6,167,460 A | 12/2000 | Okada et al. |
| 6,364,442 B1 | 4/2002 | Kawase et al. |

(Continued)

FOREIGN PATENT DOCUMENTS

| EP | 0 777 175 A1 | 6/1997 |
| EP | 1 610 216 A1 | 12/2005 |

(Continued)

*Primary Examiner* — Lennin R Rodriguezgonzalez
(74) *Attorney, Agent, or Firm* — Foley & Lardner LLP

(57) ABSTRACT

A print control device 31 connected to a host 20 and a printer 32 has a print data receiving unit 81 that receives print data written in markup language from the host 20, a command generating unit 82 that adds an initialization command before the print data and generates a print instruction command, and a command transmission unit 83 that transmits the generated print instruction command to the printer 32.

9 Claims, 24 Drawing Sheets

(56) References Cited

U.S. PATENT DOCUMENTS

| | | |
|---|---|---|
| 6,847,377 B2 | 1/2005 | Kitahara et al. |
| 7,085,006 B2 | 8/2006 | Yokoyama et al. |
| 7,280,258 B2 | 10/2007 | Kitahara et al. |
| 7,292,369 B2 | 11/2007 | Yokoyama et al. |
| 8,289,566 B2 | 10/2012 | Yokoyama et al. |
| 2001/0001130 A1 | 5/2001 | Miyasaka et al. |
| 2001/0001838 A1 | 5/2001 | Miyasaka et al. |
| 2001/0024585 A1 | 9/2001 | Koakutsu et al. |
| 2002/0012560 A1 | 1/2002 | Miyasaka et al. |
| 2002/0093681 A1 | 7/2002 | Hitaka |
| 2004/0130744 A1 | 7/2004 | Wu et al. |
| 2004/0145760 A1 | 7/2004 | Kurumida |
| 2005/0265066 A1 | 12/2005 | Machiyama |
| 2006/0055973 A1 | 3/2006 | Saikawa |
| 2006/0120786 A1 | 6/2006 | Hisatomi et al. |
| 2006/0227343 A1 | 10/2006 | Yamaguchi |
| 2007/0115492 A1* | 5/2007 | Kikuyama ............ G06F 3/1204 358/1.13 |
| 2007/0263248 A1 | 11/2007 | Oshima et al. |
| 2008/0097746 A1 | 4/2008 | Tagata et al. |
| 2009/0231620 A1* | 9/2009 | Kaneko .................. G06F 3/121 358/1.15 |
| 2010/0165399 A1 | 7/2010 | Kawasaki |
| 2010/0231967 A1* | 9/2010 | Arai .................. H04N 1/40068 358/1.15 |
| 2011/0122438 A1 | 5/2011 | Someya et al. |
| 2012/0062946 A1 | 3/2012 | Kitagata |
| 2012/0069391 A1 | 3/2012 | Yonezawa et al. |
| 2012/0188598 A1 | 7/2012 | Furuya |
| 2012/0314248 A1 | 12/2012 | Zhou et al. |

FOREIGN PATENT DOCUMENTS

| | | |
|---|---|---|
| EP | 1 816 558 A2 | 8/2007 |
| JP | 06-015927 A | 1/1994 |
| JP | 06-083551 A | 3/1994 |
| JP | 07-271534 A | 10/1995 |
| JP | 08-282024 A | 10/1996 |
| JP | 10-171615 A | 6/1998 |
| JP | 11-208071 A | 8/1999 |
| JP | 2000-163237 A | 6/2000 |
| JP | 2002-244821 A | 8/2002 |
| JP | 2002-269550 A | 9/2002 |
| JP | 2002-287914 A | 10/2002 |
| JP | 2004-070521 A | 3/2004 |
| JP | 2005-250706 A | 9/2005 |
| JP | 2005-317044 A | 11/2005 |
| JP | 2005-343028 A | 12/2005 |
| JP | 2006-293506 A | 10/2006 |
| JP | 2006-343817 A | 12/2006 |
| JP | 2007-241758 A | 9/2007 |
| JP | 2008-107964 A | 5/2008 |
| JP | 2008-120094 A | 5/2008 |
| JP | 2008-226124 A | 9/2008 |
| JP | 2009-015750 A | 1/2009 |
| JP | 2010-176164 A | 8/2010 |
| JP | 2011-090479 A | 5/2011 |
| JP | 2011-108171 A | 6/2011 |
| JP | 2011-170429 A | 9/2011 |
| JP | 2012-061754 A | 3/2012 |

* cited by examiner

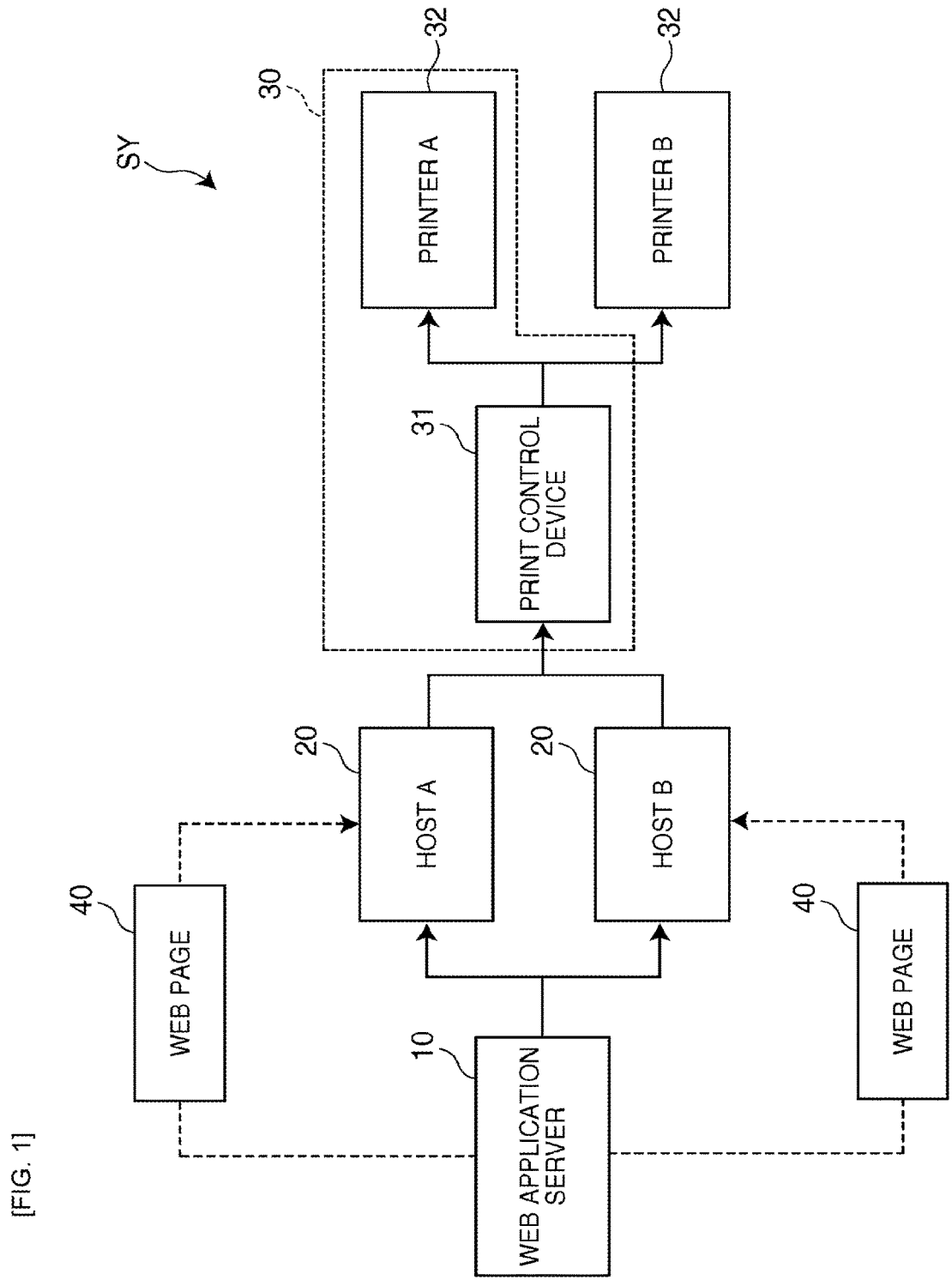

[FIG. 2A]
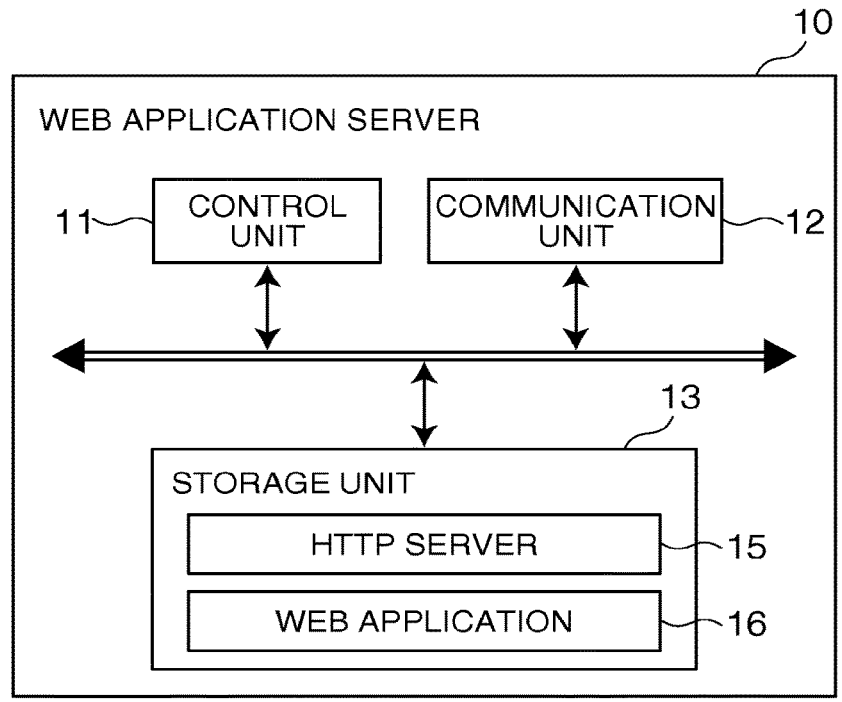
[FIG. 2B]
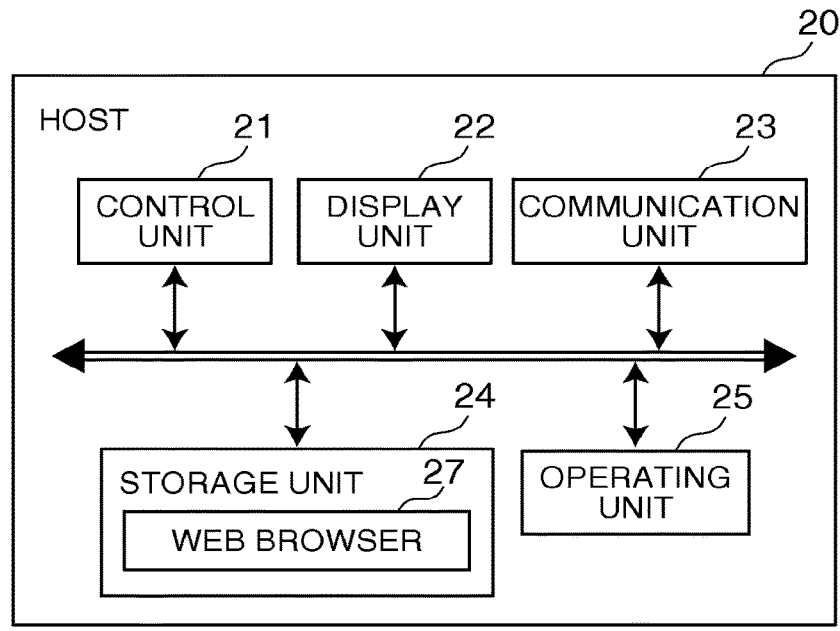

[FIG. 3]
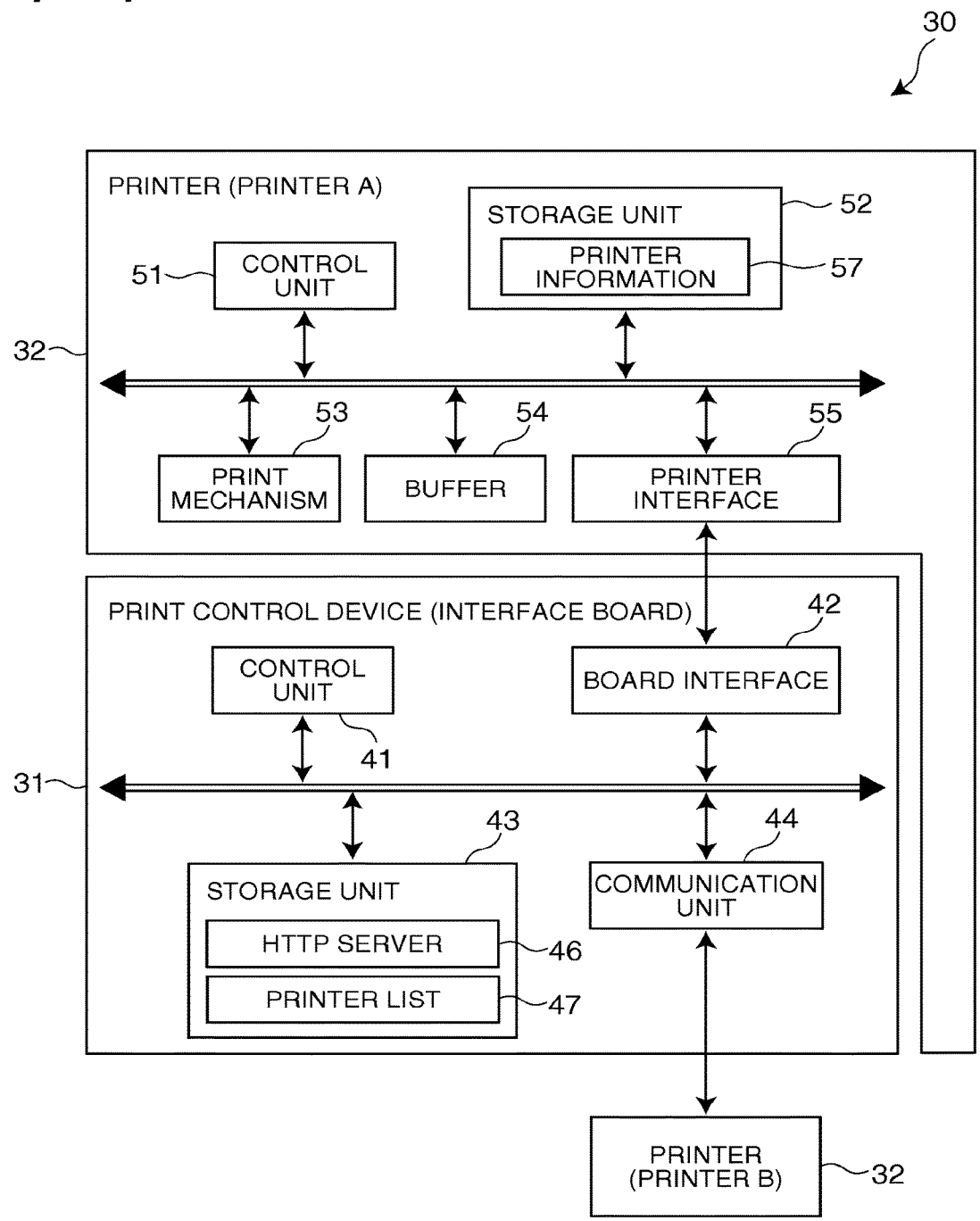

[FIG. 4]
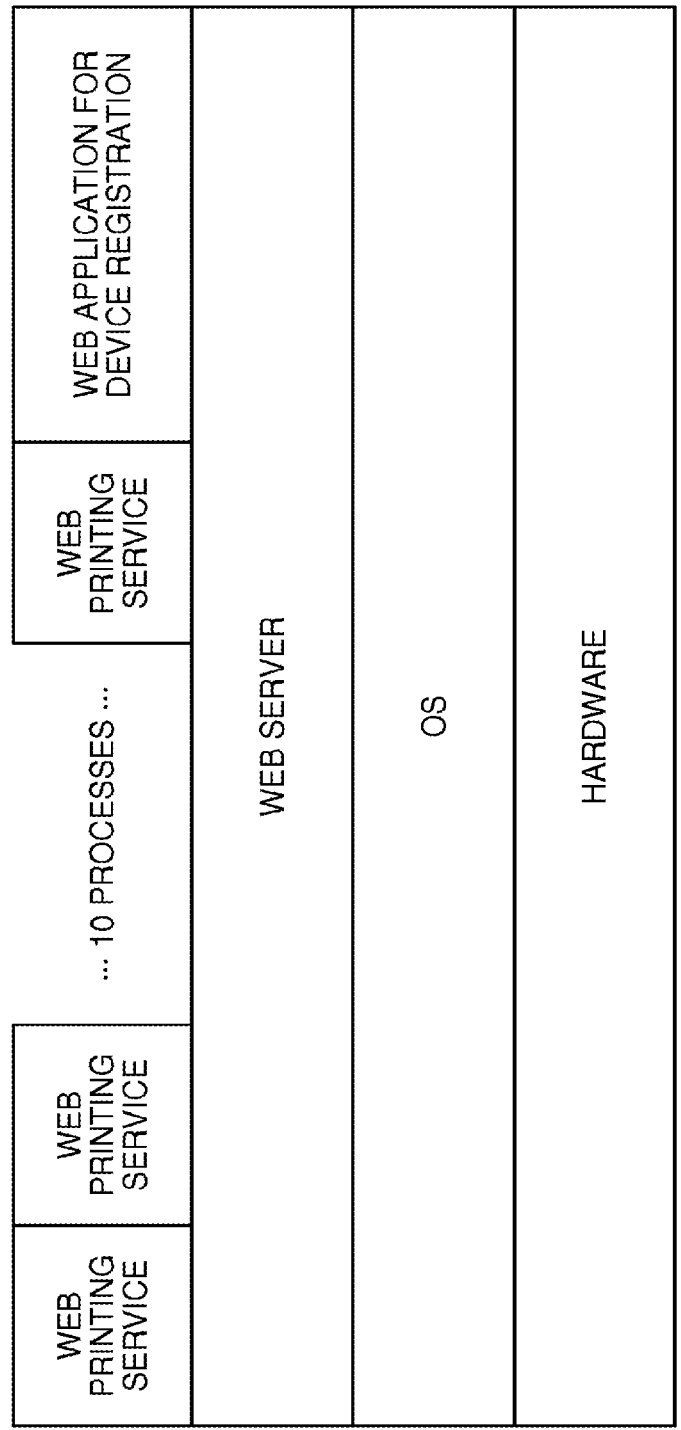

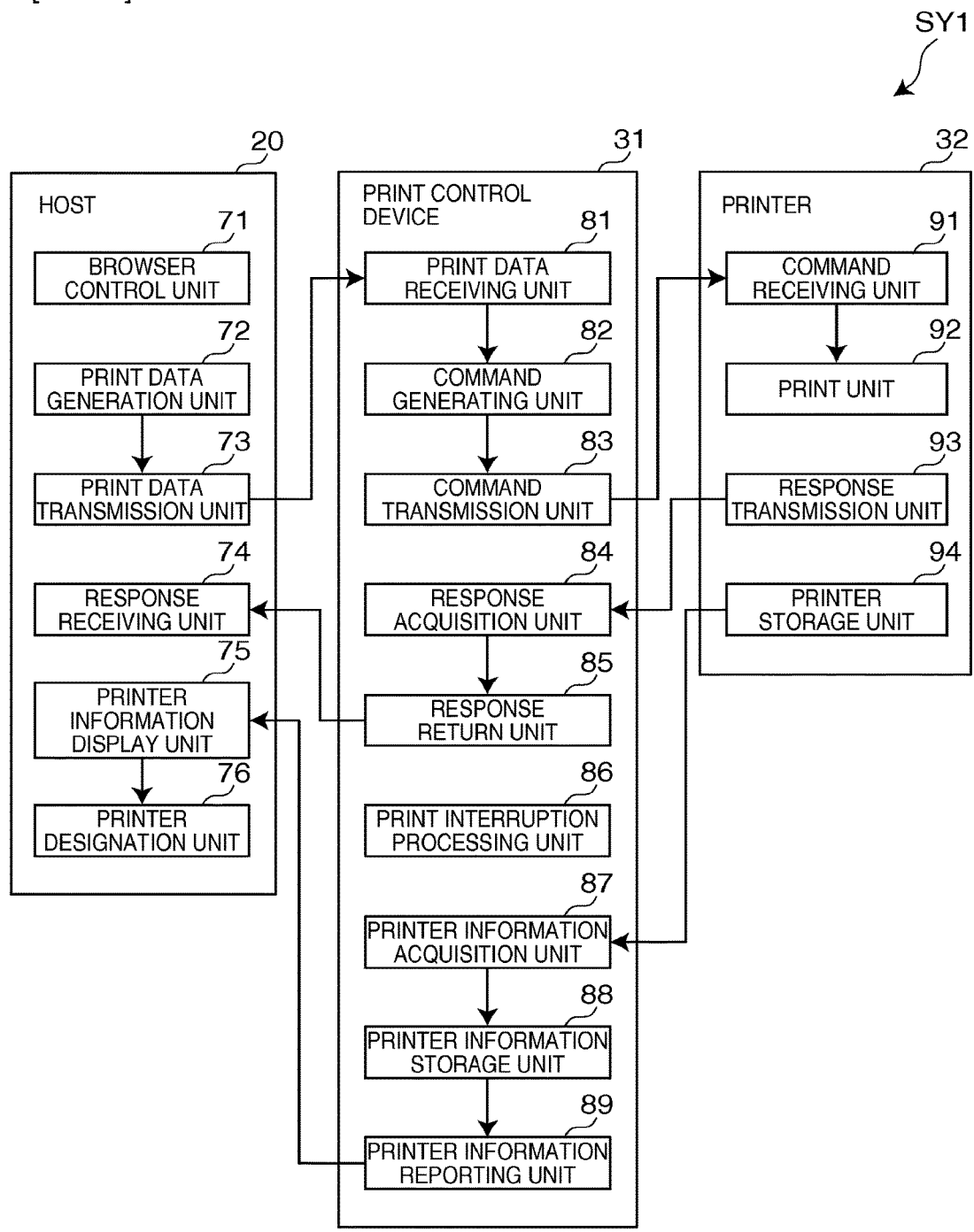
[FIG. 5]

[FIG. 6A]
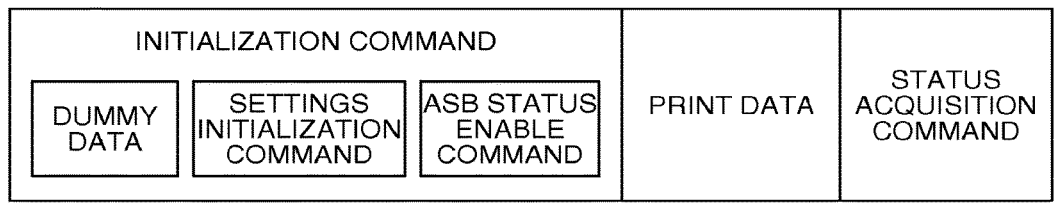
[FIG. 6B]
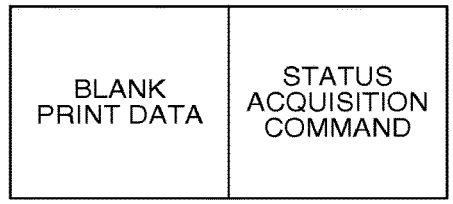

[FIG. 7]
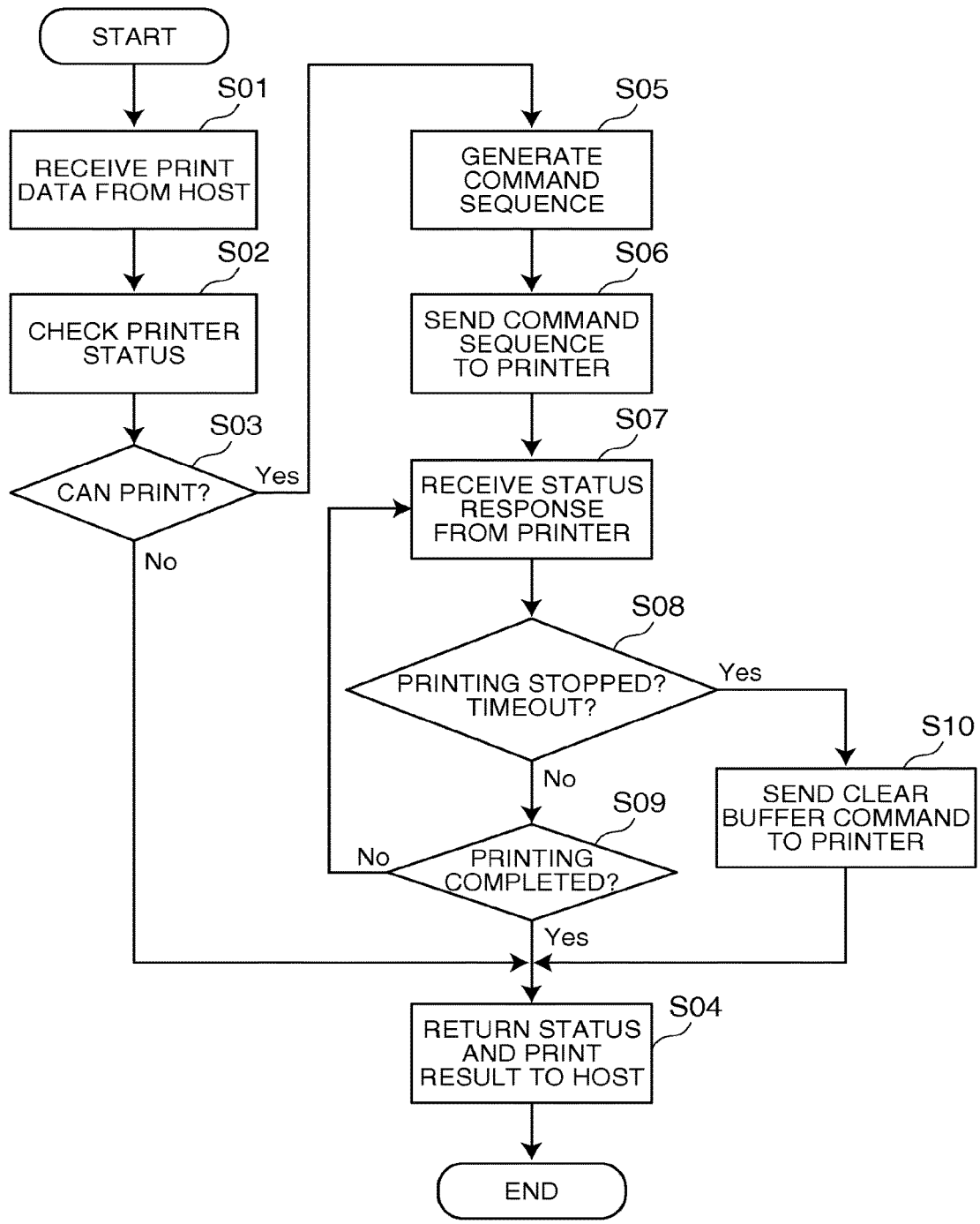

[FIG. 8]
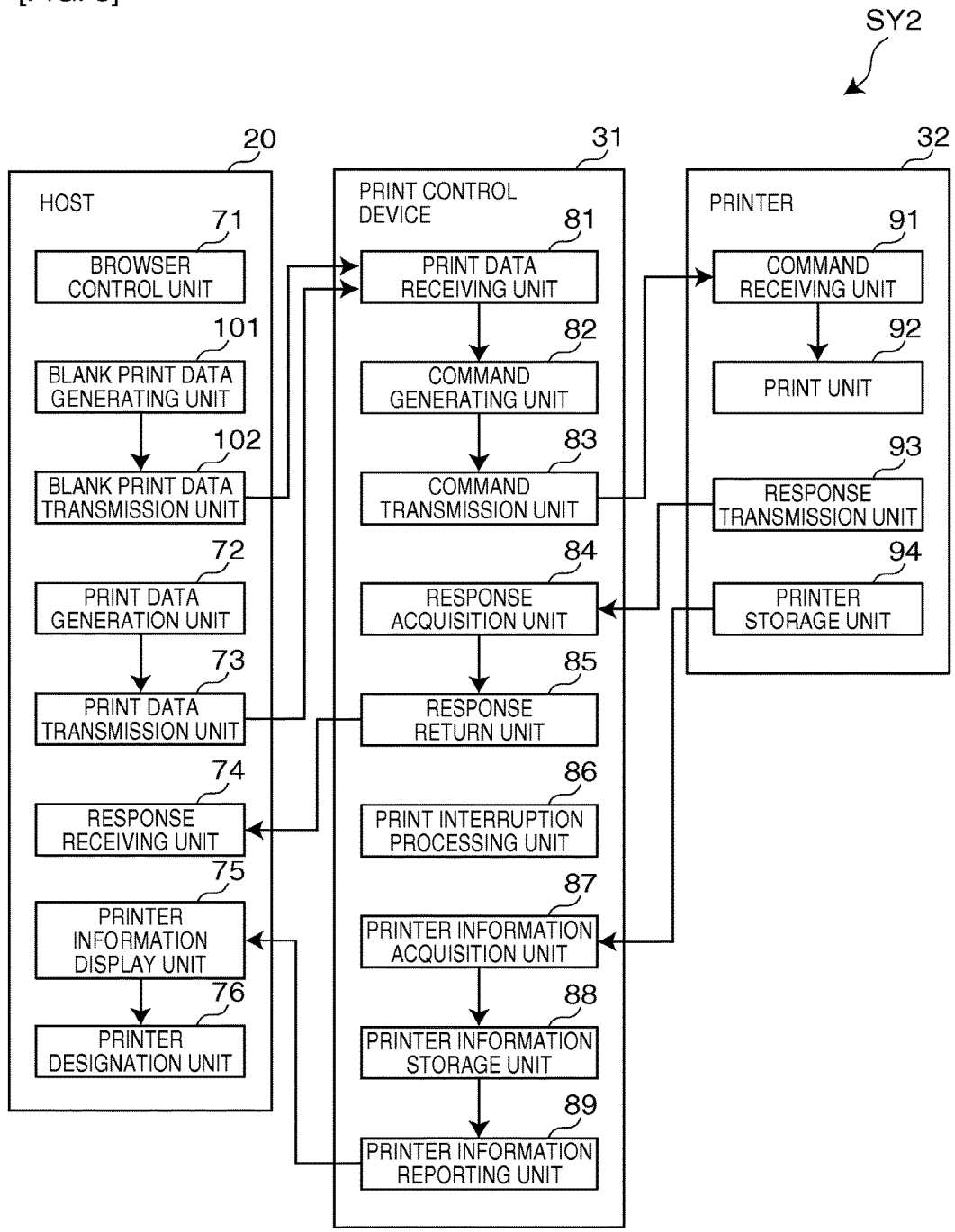

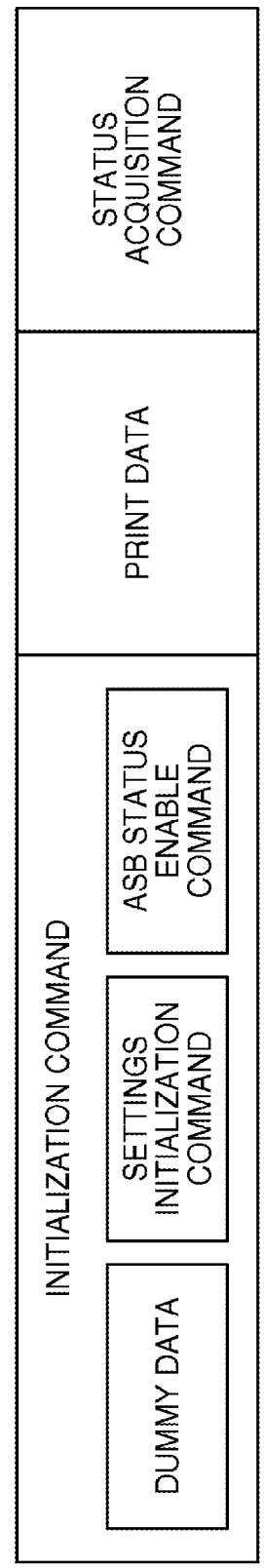
[FIG. 9]

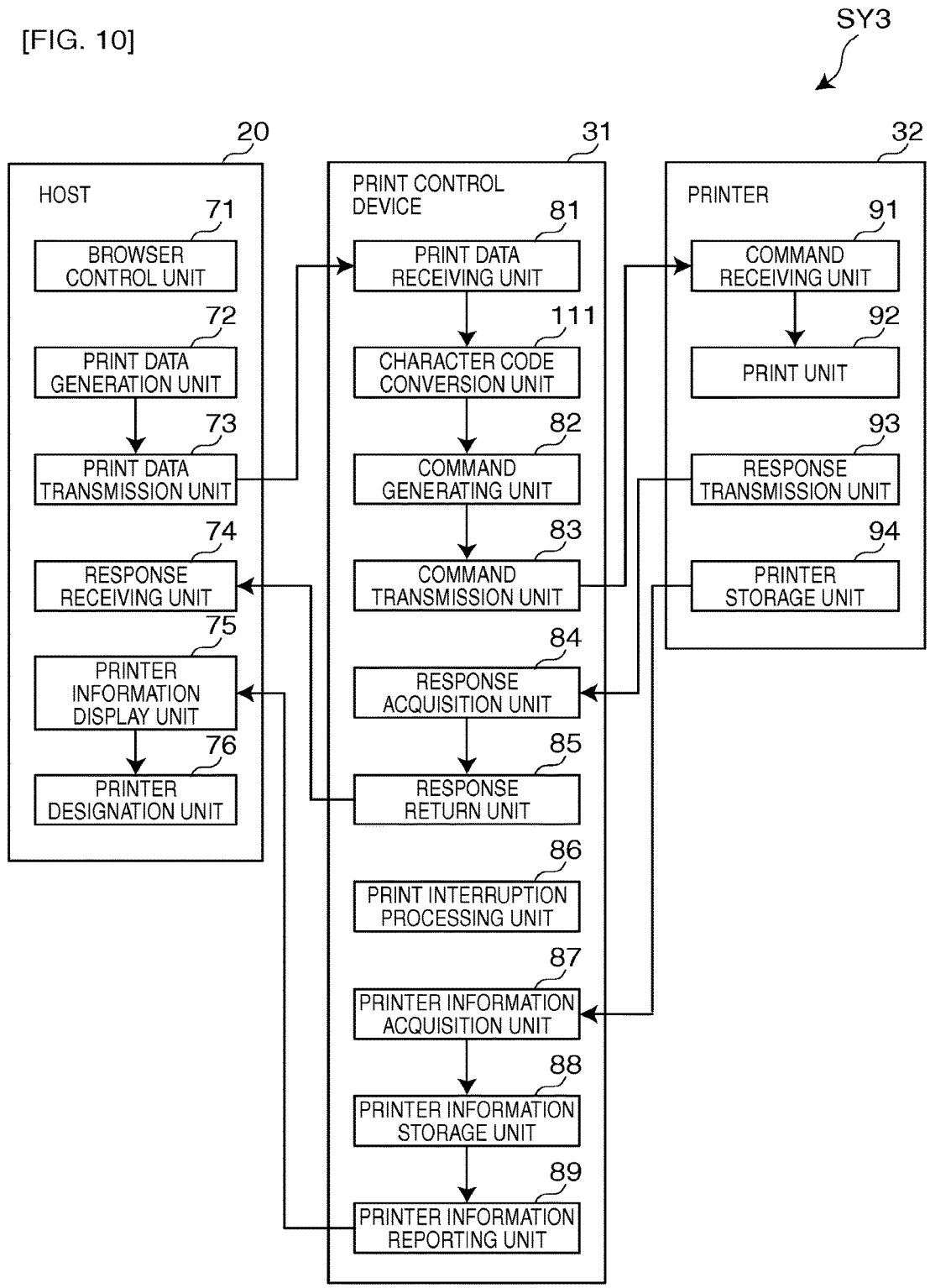
[FIG. 10]

[FIG. 11A]

| LANGUAGE SETTING | INSTALLED CHARACTERS | CHARACTER ENCODING USED (KANJI MODE) |
|---|---|---|
| JAPANESE | WESTERN, INTERNATIONAL, JAPANESE | KANJI MODE (Shift_JIS) |
| KOREAN | WESTERN, INTERNATIONAL, KOREAN | KANJI MODE (KSC5601) |
| SIMPLIFIED CHINESE | WESTERN, INTERNATIONAL, SIMPLIFIED CHINESE | KANJI MODE (GB18030) |
| TRADITIONAL CHINESE | WESTERN, INTERNATIONAL, TRADITIONAL CHINESE | KANJI MODE (Big5) |
| ANK | ANK, INTERNATIONAL | — |

[FIG. 11B]

| LANGUAGE ATTRIBUTE | CHANGE CHARACTER CODE COMMAND |
|---|---|
| ja | KANJI MODE, CHARACTER CODE TABLE = KATAKANA INTERNATIONAL CHARACTER SET = JAPANESE, CONVERT CHARACTERS TO Shift_JIS |
| ko | KANJI MODE, INTERNATIONAL CHARACTER SET = KOREAN CONVERT CHARACTERS TO KSC5601 |
| zn-cn | KANJI MODE, INTERNATIONAL CHARACTER SET = CHINESE CONVERT CHARACTERS TO GB18030 |
| zn-tw | KANJI MODE, INTERNATIONAL CHARACTER SET = CHINESE CONVERT CHARACTERS TO Big5 |
| en | CANCEL KANJI MODE, INTERNATIONAL CHARACTER SET = ENGLISH CONVERT CHARACTERS WITH UNICODE CONVERSION MODULE |

[FIG. 12]
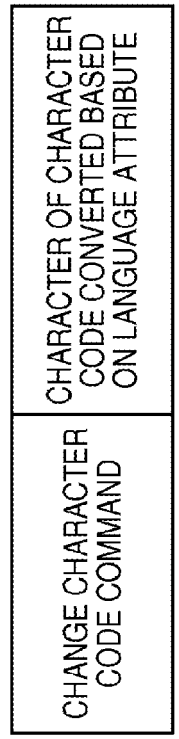
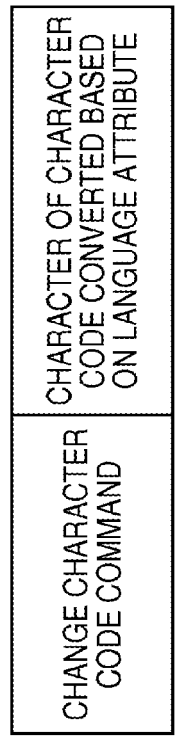

[FIG. 13]

```xml
<?xml version="1.0" encoding="utf-8"?>
<document>
```
- C1 → `<text lang="en">Hello</text>`
- C2 → `<text lang="fr">Bonjour</text>`
- C3 → `<text lang="de">Hallo</text>`
- C4 → `<text lang="it">Ciao</text>`
- C5 → `<text lang="es">¡Hola</text>`
- C6 → `<text lang="pt">Olá</text>`
- C7 → `<text lang="ja">こんにちは</text>`
- C8 → `<text lang="ko">안녕하세요</text>`
- C9 → `<text lang="zn-cn">你好</text>`
- C10 → `<text lang="zn-tw">你好</text>`

```xml
</document>
```

[FIG. 14A]   JAPANESE

> Hello
> Bonjour
> Hallo
> Ciao
> ¡Hola
> Olá
> こんにちは

[FIG. 14B]   KOREAN

> Hello
> Bonjour
> Hallo
> Ciao
> ¡Hola
> Olá
> 안녕하세요

[FIG. 14C]   ANK

> Hello
> Bonjour
> Hallo
> Ciao
> ¡Hola
> Olá

[FIG. 15]
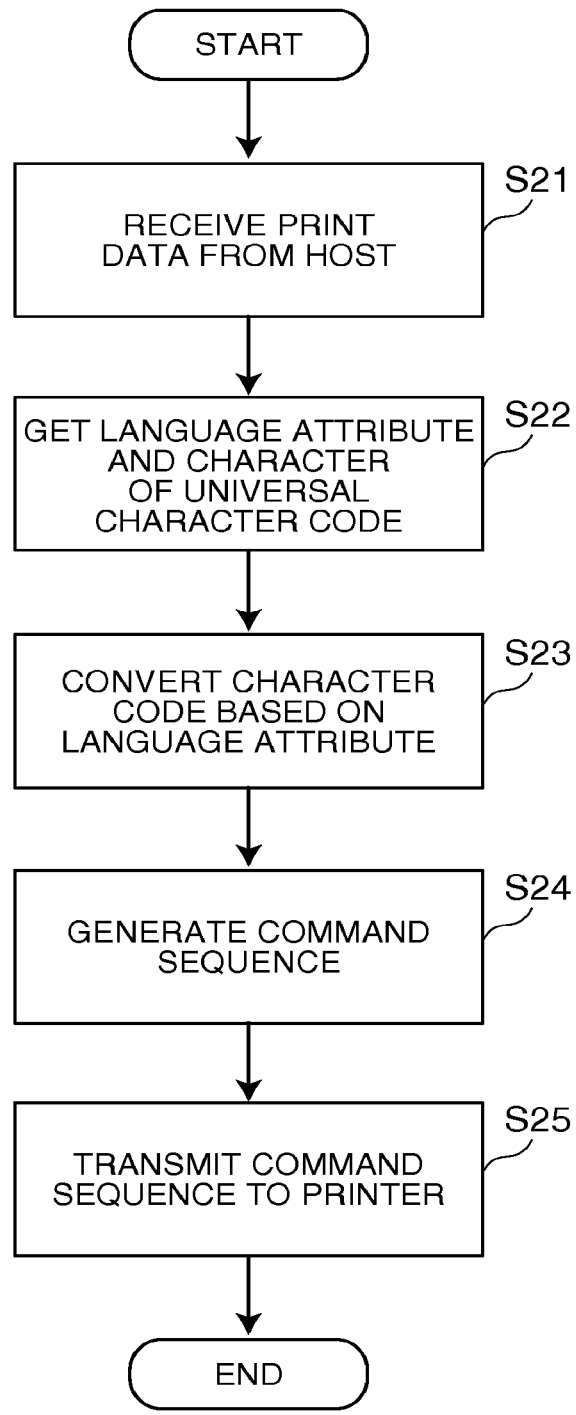

[FIG. 16]
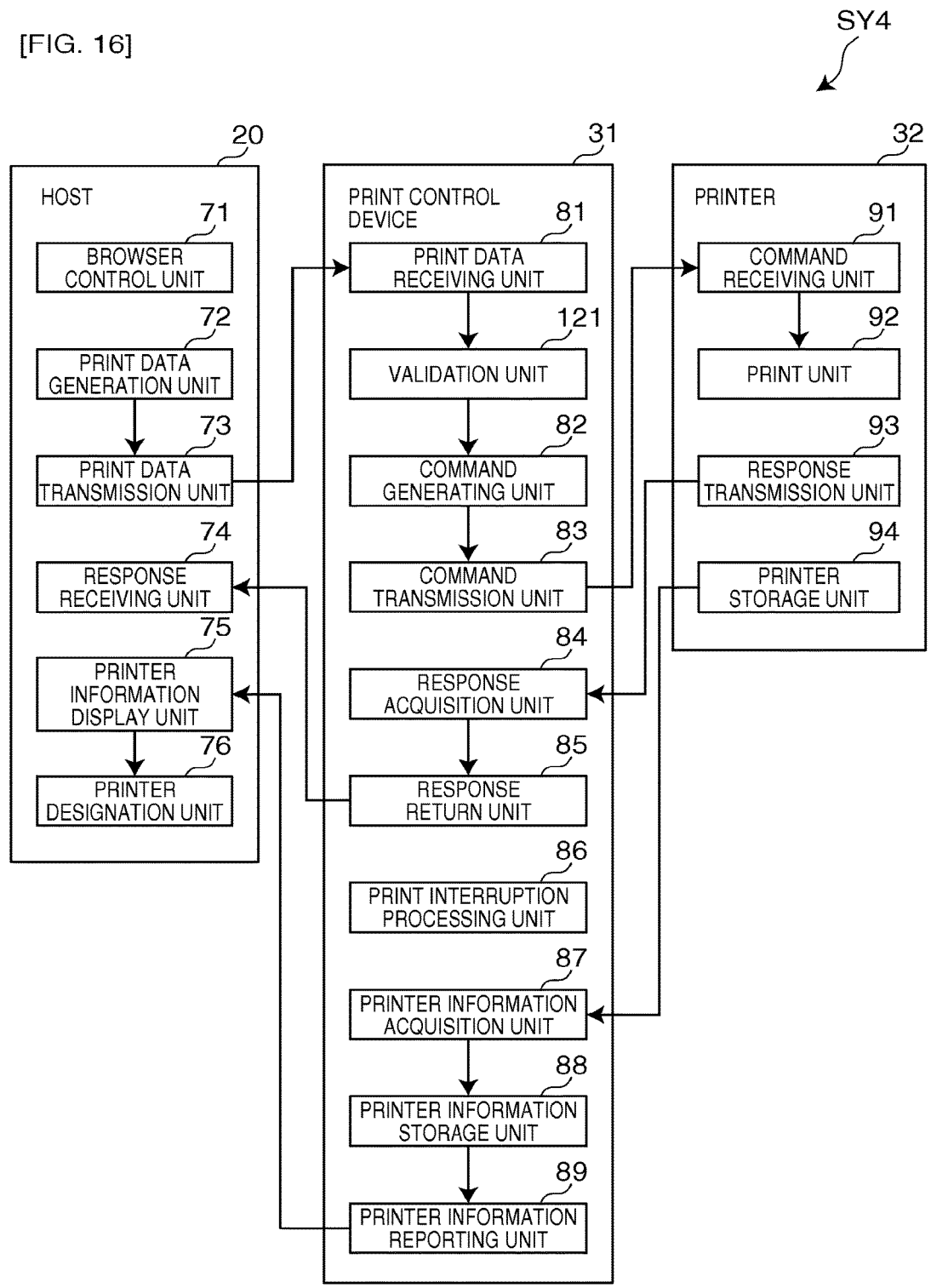

[FIG. 17A]
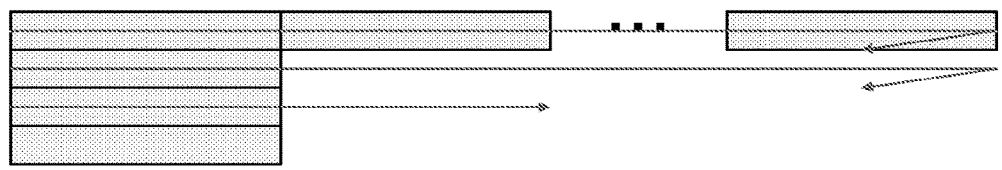
[FIG. 17B]
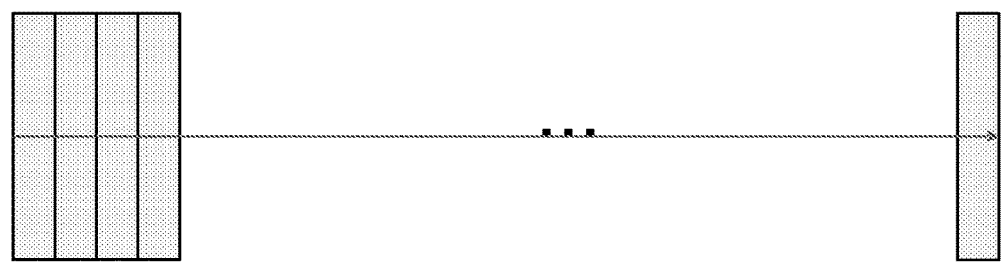

[FIG. 18A]
NORMAL MODE, MONOCHROME, NO SEGMENTS
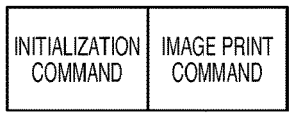
[FIG. 18B]
NORMAL MODE, MONOCHROME, WITH SEGMENTS
[FIG. 18C]
PAGE MODE, MONOCHROME, NO SEGMENTS
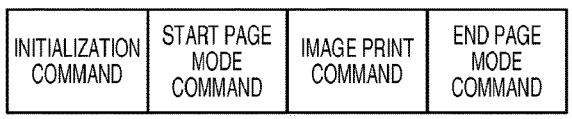
[FIG. 18D]
PAGE MODE, MONOCHROME, WITH SEGMENTS
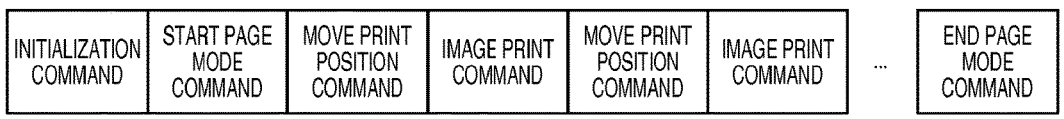

[FIG. 19A]

NORMAL MODE, GRAY SCALE, NO SEGMENTS

| INITIALIZATION COMMAND | IMAGE PRINT COMMAND (50%) | IMAGE PRINT COMMAND (25%) | IMAGE PRINT COMMAND (12.5%) | IMAGE PRINT COMMAND (6.25%) |
|---|---|---|---|---|

[FIG. 19B]

NORMAL MODE, GRAY SCALE, WITH SEGMENTS

| INITIALIZATION COMMAND | IMAGE PRINT COMMAND (50%) | IMAGE PRINT COMMAND (25%) | IMAGE PRINT COMMAND (12.5%) | IMAGE PRINT COMMAND (6.25%) | IMAGE PRINT COMMAND (50%) | IMAGE PRINT COMMAND (25%) |
|---|---|---|---|---|---|---|
| IMAGE PRINT COMMAND (12.5%) | IMAGE PRINT COMMAND (6.25%) | ... | | | | |

[FIG. 19C]

PAGE MODE, GRAY SCALE, NO SEGMENTS

| INITIALIZATION COMMAND | START PAGE MODE COMMAND | IMAGE PRINT COMMAND (50%) | IMAGE PRINT COMMAND (25%) | IMAGE PRINT COMMAND (12.5%) | IMAGE PRINT COMMAND (6.25%) | END PAGE MODE COMMAND |
|---|---|---|---|---|---|---|

[FIG. 19D]

PAGE MODE, GRAY SCALE, WITH SEGMENTS

| INITIALIZATION COMMAND | START PAGE MODE COMMAND | MOVE PRINT POSITION COMMAND | IMAGE PRINT COMMAND (50%) | IMAGE PRINT COMMAND (25%) | IMAGE PRINT COMMAND (12.5%) | IMAGE PRINT COMMAND (6.25%) |
|---|---|---|---|---|---|---|
| MOVE PRINT POSITION COMMAND | IMAGE PRINT COMMAND (50%) | IMAGE PRINT COMMAND (25%) | IMAGE PRINT COMMAND (12.5%) | IMAGE PRINT COMMAND (6.25%) | ... | END PAGE MODE COMMAND |

[FIG. 20A]

NORMAL MODE, COLOR, NO SEGMENTS

| INITIALIZATION COMMAND | IMAGE PRINT COMMAND (Y) | IMAGE PRINT COMMAND (M) | IMAGE PRINT COMMAND (C) | IMAGE PRINT COMMAND (K) |
|---|---|---|---|---|

[FIG. 20B]

NORMAL MODE, COLOR, WITH SEGMENTS

| INITIALIZATION COMMAND | IMAGE PRINT COMMAND (Y) | IMAGE PRINT COMMAND (M) | IMAGE PRINT COMMAND (C) | IMAGE PRINT COMMAND (K) | IMAGE PRINT COMMAND (Y) | IMAGE PRINT COMMAND (M) |
|---|---|---|---|---|---|---|
| IMAGE PRINT COMMAND (C) | IMAGE PRINT COMMAND (K) | ... | | | | |

[FIG. 20C]

PAGE MODE, COLOR, NO SEGMENTS

| INITIALIZATION COMMAND | START PAGE MODE COMMAND | IMAGE PRINT COMMAND (Y) | IMAGE PRINT COMMAND (M) | IMAGE PRINT COMMAND (C) | IMAGE PRINT COMMAND (K) | END PAGE MODE COMMAND |
|---|---|---|---|---|---|---|

[FIG. 20D]

PAGE MODE, COLOR, WITH SEGMENTS

| INITIALIZATION COMMAND | START PAGE MODE COMMAND | MOVE PRINT POSITION COMMAND | IMAGE PRINT COMMAND (Y) | IMAGE PRINT COMMAND (M) | IMAGE PRINT COMMAND (C) | IMAGE PRINT COMMAND (K) |
|---|---|---|---|---|---|---|
| MOVE PRINT POSITION COMMAND | IMAGE PRINT COMMAND (Y) | IMAGE PRINT COMMAND (M) | IMAGE PRINT COMMAND (C) | IMAGE PRINT COMMAND (K) | ... | END PAGE MODE COMMAND |

[FIG. 21]

```
<?xml version="1.0" encoding="utf-8"?>
<document>
    <!-- Monochrome, 1bit/pixel -->
D1→ <image width="24" height="24">AAAA ... AAAA</image>
D2→ <image width="24" height="24" mode="mono">AAAA ... AAAA</image>
    <!-- Grayscale, 4bit/pixel -->
D3→ <image width="24" height="24" mode="gray16">AAAA ... AAAA</image>
    <!-- Grayscale, 8bit/pixel -->
D4→ <image width="24" height="24" mode="gray256">AAAA ... AAAA</image>
    <!-- RGB, 24bit/pixel -->
D5→ <image width="24" height="24" mode="rgb">AAAA ... AAAA</image>
    <!-- CMYK, 32bit/pixel -->
D6→ <image width="24" height="24" mode="cmyk">AAAA ... AAAA</image>
</document>
```

[FIG. 22A]  IMAGE FILE
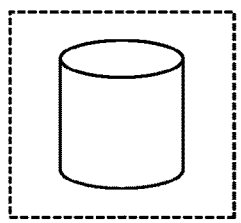
[FIG. 22B]  FOR MONOCHROME PRINTING
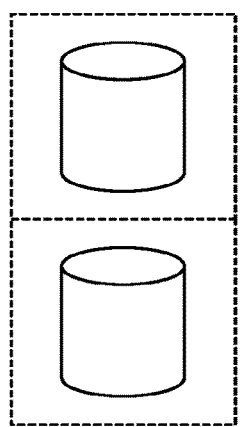
[FIG. 22C]  FOR MONOCHROME PRINTING, 4-bit GRAY SCALE
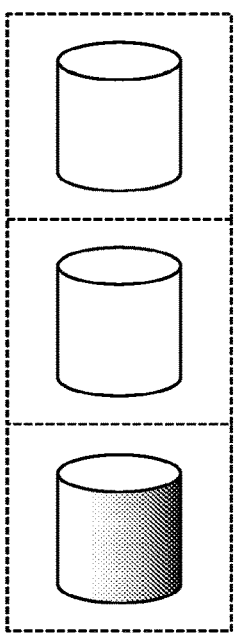

[FIG. 23]
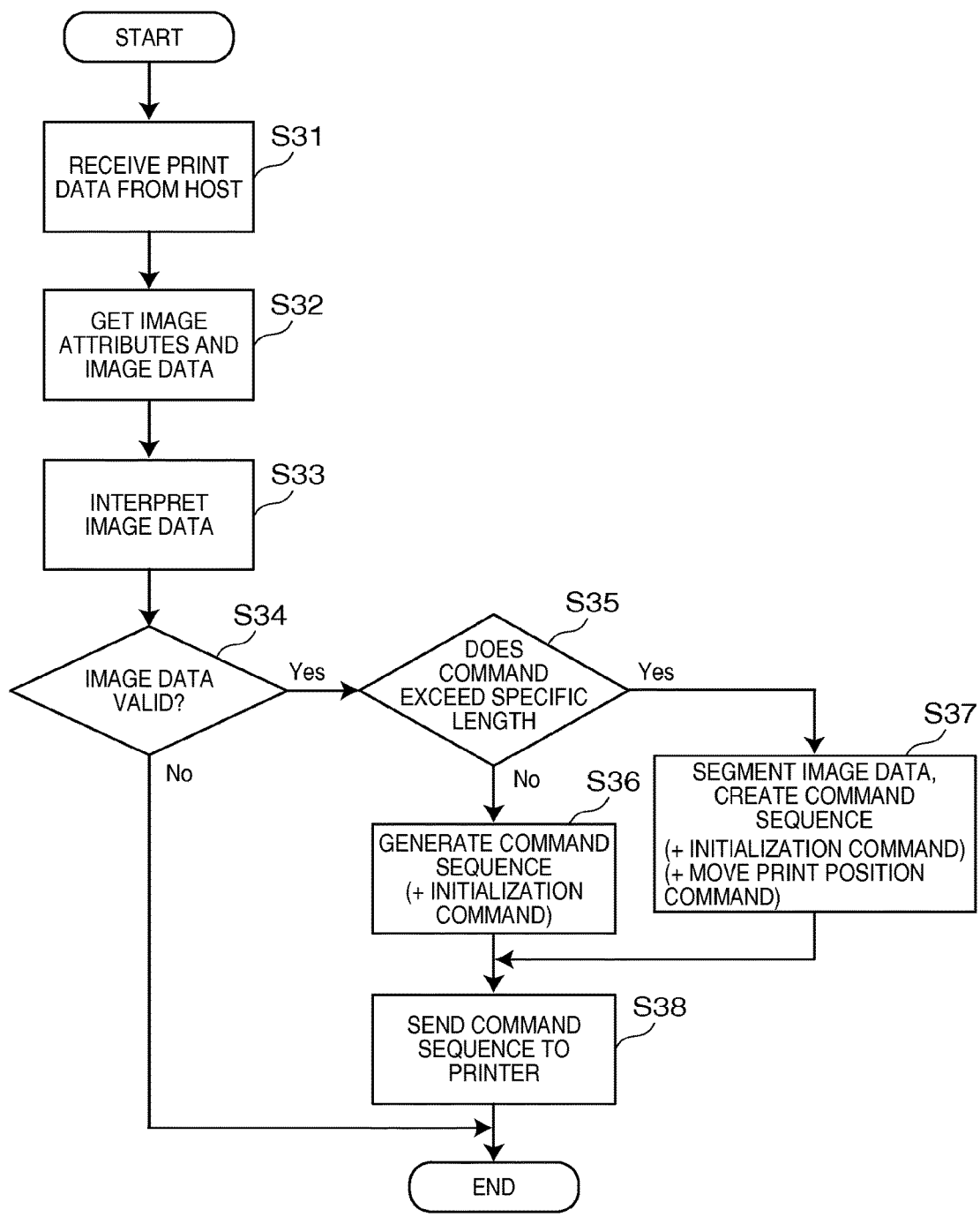

[FIG. 24A]
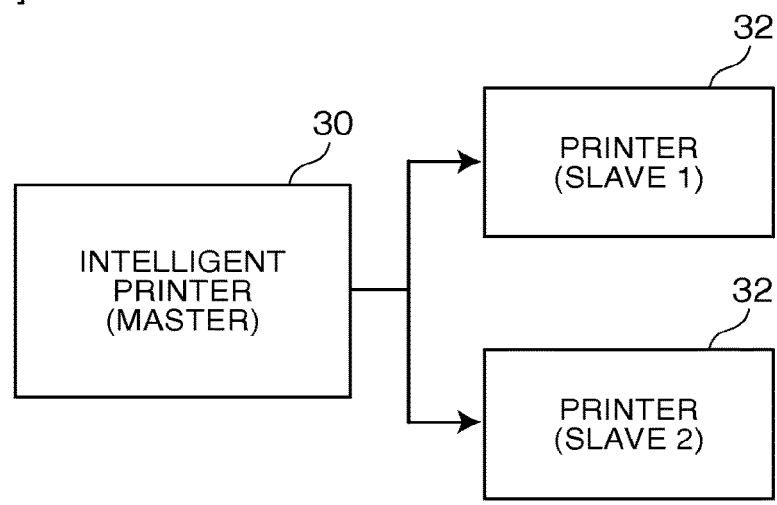
[FIG. 24B]
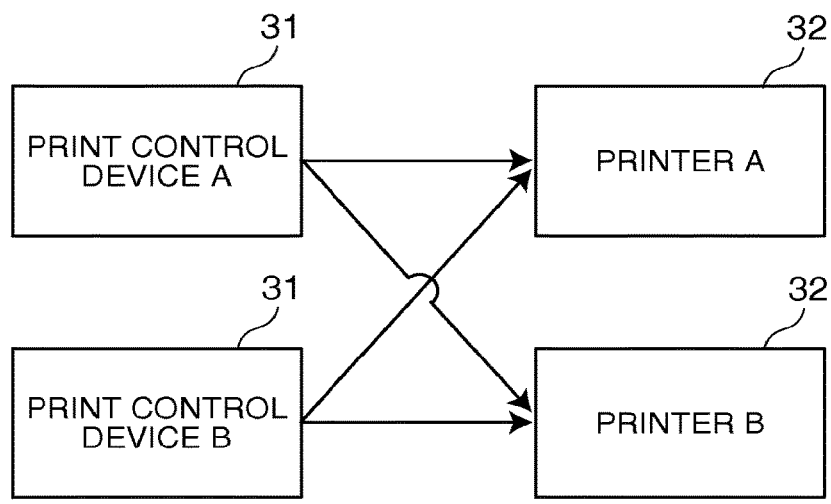

PRINT CONTROL DEVICE, PRINTING SYSTEM, AND PRINT CONTROL METHOD FOR GENERATING IMAGE PRINT COMMANDS FROM PRINT DATA IN MARKUP LANGUAGE

CROSS-REFERENCE TO RELATED APPLICATIONS

This application is a continuation of U.S. application Ser. No. 14/384,364, filed Sep. 10, 2014; which is a National Stage Entry of International Appl. No. PCT/JP2013/060141, filed Mar. 27, 2013; which claims priority to Japanese Appl. No. 2012-084631 filed Apr. 3, 2012; Japanese Appl. No. 2012-084630 filed Apr. 3, 2012; Japanese Appl. No. 2012-081330 filed Mar. 30, 2012; and Japanese Appl. No. 2012-081321 filed Mar. 30, 2012; the disclosures of all of which are incorporated by reference herein in their entirety.

TECHNICAL FIELD

The present invention relates to a print control device that controls a printing device with print control commands, to a printing system, and to a print control method.

BACKGROUND ART

The ESC/POS® command system is a de facto industry standard command system for controlling printers (receipt printers) and other peripheral devices from a POS (point of sales) terminal. See, for example, Patent Literature 1.

CITATION LIST

Patent Literature

PTL 1: JP-A-2005-343028

SUMMARY OF INVENTION

Technical Problem

The ESC/POS® command system, however, assumes a 1:1 connection between the POS terminal and the printer. As a result, problems occur when there is a many-to-one or a many-to-many relationship between POS terminals and printers connected over a network. For example, if the current print job ends in an error, the printer is not re-initialized and can therefore not process subsequent print commands from other POS terminals normally. In addition, if the printer settings were changed by the POS terminal, those settings will remain in the printer, and subsequent print commands from other POS terminals cannot be processed normally.

The present invention is directed to the foregoing problem, and an object of the invention is to provide a print control device, a printing system, and a print control method that can control a printer using print control commands even when the host and the printer are connected in a many-to-one or a many-to-many relationship.

Solution to Problem

A print control device according to the invention is characterized by comprising a print data receiving unit that receives print data written in a markup language; a command generating unit that adds an initialization command to the print data and generates a print instruction command; and a command transmission unit that transmits the print instruction command to a printer.

A print control method according to the invention is characterized by: receiving print data written in markup language; adding an initialization command to the print data; and transmitting print data with the initialization command added to a printer.

By generating and sending to the printer a print instruction command having an initialization command added before the print data that is sent from the host, this aspect of the invention enables controlling printers using print control commands intended for a one-to-one connection, such as ESC/POS® commands. For example, because an initialization command is added before the print data from the next host B, the command sequence from host B can be processed normally even when a preceding print job based on print instructions from a host A does not end normally. In addition, when a printer configuration setting has been changed by a command from host A, print data from the next host B can be interpreted normally because an initialization command is added before the print data from the next host B and the printer is reinitialized. The existing command system can thus be maintained while enabling an existing printer to respond to plural hosts. Furthermore, because the host writes the print data in a widely compatible markup language (such as XML, HTML, XHTML), the host platform is not important. For example, the host could be a tablet computer, embedded device, or other device that operates on a driverless platform.

In the foregoing print control device: the command generating unit adds a status acquisition command that acquires the printer status to the print instruction command; the command transmission unit transmits the print instruction command to which the status acquisition command was added to the printer; and the print control device includes a response acquisition unit that acquires a response to the print instruction command with the added status acquisition command sent from the printer; and a response return unit that transmits a print result based on the response.

In this aspect of the invention the printer returns a response to the print instruction command (status acquisition command) after completing the printing operation, and the host can therefore know that the print data was processed normally by the printer.

Note that the printer status denotes status information such as the on-line/off-line state, amount of remaining ink or toner, and the reserve power left in the battery. The print result denotes information indicating whether printing succeeded or failed.

The print control device could also send the printer status to the host instead of sending the print result.

In the foregoing print control device: the initialization command includes an enable command that enables a status returned by the printer; the response acquisition unit acquires the status sent from transmission of the print instruction command with the added status acquisition command until a response to the status acquisition command is received; and the response return unit transmits the status acquired by the response acquisition unit with the print result.

In this aspect of the invention the host can know not only the print result (print success/print failure), but also the latest printer status (state).

Note that the printer in this configuration can process an ASB (Auto Status Back) enable command. Note that a status that the printer returns automatically denotes status information that is automatically transmitted from the printer when there is a change in a particular printer state (such as a cover opening/closing, no paper, printing completed).

In the print control device described above: the command generating unit generates a pre-printing command with the status acquisition command added to specific print data (blank print data) before generating the print instruction command when the print data is sent; the command transmission unit transmits the pre-printing command to the printer; the response acquisition unit receives a response to the pre-printing command; a print interrupt process unit executes a print interrupt process when the printer is determined unable to print based on the response to the pre-printing command acquired by the response acquisition unit; and the print interrupt process includes a process that reports a print interruption to the transmission source of the print data, and a process that stops transmission of the print instruction command to the printer.

This configuration enables determining if the printer is capable of printing before starting to print. The print interrupt process can therefore be executed easily when the printer cannot print. Because interruption of printing is also reported to the host, the state of the printer can be known on the host side.

Note that the print interrupt process is preferably also executed when plural printers are connected and the printer specified by the host does not exist.

The following configuration is also conceivable.

The foregoing print control device has a validation unit that validates the print data using a markup schema, and the print interrupt process unit executes the print interrupt process if the validation unit determines the print data is not valid.

This aspect of the invent ion can thus use a markup schema to validate print data.

A printing system according to the invention comprises a first host that transmits print data written in markup language; a second host that transmits print data written in markup language; a printer that prints print data transmitted from the first host and the second host; and a print control device that has a print data receiving unit that receives print data from the first host and second host, a command generating unit that adds an initialization command before the print data and generates a print instruction command, and a command transmission unit that transmits the print instruction command to the printer.

This aspect of the invention provides a printing system that can control a printer using a print control command even when hosts and printers are connected many-to-one or many-to-many.

The following configuration can also be used. In the foregoing print control device, connection to plural hosts is possible, and of the plural hosts, the response return unit preferably responds to the host that was the transmission source of the print data. This aspect of the invention enables only the host that transmitted the print data in the group of plural hosts to know the result of processing the transmitted print data. That is, the other hosts do not unnecessarily receive the result of printing the transmitted print data.

Further preferably in the foregoing print control device, the print interrupt process includes a process that sends a clear buffer command, which is a real-time command that clears a printer buffer, to the printer. This aspect of the invention can process the next print job normally even when the previous print job did not end normally and a command remains in the printer buffer.

Further preferably, the foregoing print control device can connect to plural printers, printer selection information specifying a printer for printing is added to the print data transmitted from the host, and the command transmission unit transmits the print instruction command to the printer specified by the printer selection information. This aspect of the invention enables applying the invention in a network environment having plural printers connected.

The foregoing print control device preferably also has a printer information acquisition unit that gets printer information, which is information related to a printer, from a connected printer, and a printer information reporting unit that reports the acquired printer information for the printer to a plurality of hosts; and each host displays the reported printer information for the printer, and the printer to use for printing is selected from the displayed printer information. This aspect of the invention provides a printer information acquisition and report means, and a printer selection means, to the host. More specifically, the host does not need to execute these processes.

A printer according to another aspect of the invention has the parts of the foregoing print control device, and functions as one of the plural printers. This configuration enables applying the invention in a network environment in which the printer having the parts of the print control device is a master, and the other printers are slave devices.

Further preferably in the print control device described above, the print data receiving unit receives print data containing a first character code with an added language attribute; a character code conversion unit converts the first character code to a second character code compatible with the printer based on the language attribute; and the command generating unit generates a print instruction command adding a change character code command, which changes a character code of the printer according to the language attribute, to the second character code converted by the character code conversion unit.

In this aspect of the invention, because the print control device receives print data containing a first character code with an added language attribute, converts the first character code based on the language attribute to a second character code for the printer, and sends the second character code with a change character code command to the printer, the application programmer does not need to know the character code set of the printer even when using a host that operates on a driverless platform. For example, when the first character code is a universal character code such as Unicode, plural printer character codes may correspond to one universal character code. For example, the universal character codes for the characters read as "kanji" in Japanese are the same character codes in Japanese, Korean, and Chinese, and the language cannot be differentiated, but the printer uses different character codes for Japanese, Korean, and Chinese. Conversion to the correct character code based on the language setting of the printer is therefore possible by adding a language attribute.

This aspect of the invention is suited to using a host that operates on a driverless platform. A host that operates on a driverless platform refers, for example, to electronic devices such as embedded devices and tablet computers that do not use drivers, and to hosts that operate using web browser scripts or plugins.

When the language attribute is not added to the first character code in the foregoing print control device, the character code conversion unit converts the first character code based on a predetermined language attribute; and the command generating unit does not add the change character code command.

When printing a second character code with the same language attribute, this aspect of the invention enables omitting adding the language attribute. Because adding the change character code command is omitted in this implementation, the amount of data transmitted to the printer can be reduced.

In the foregoing print control device, the print data is written in markup language, the language attribute is written as an attribute of an element, and the first character code is written as content of an element.

This aspect of the invention writes the language attribute and first character code in markup language using the relationship between element attributes and content, and can therefore simply describe print data that has a complex structure.

Further preferably, the print control device has a storage unit that stores printer information including information related to installed characters of the printer; and a printer information reporting unit that transmits the printer information stored in the storage unit to the transmission source of the print data.

This configuration can provide a printer selection means used to specify the printer to use for printing to the host. As a result, the host can specify the host used to print based on model and installed character set information for each printer.

The following configurations are also conceivable.

In the print control device described above, the host has a browser control unit that runs a web browser, the print control device has an HTTP server, and the host generates print data using a script or plugin that runs on the web browser and sends a print request via HTTP to the print control device.

Because the web browser generates the print data, this aspect of the invention enables applying the invention to cloud computing (public cloud or private cloud).

Further alternatively, by providing the print control device with an HTTP server, and using a web service to handle processing, the host environment can be rendered as a native application (such as an embedded device or tablet device). This configuration can be used with any host platform.

A printing system according to another aspect of the invention includes a host that transmits print data including a first character code with an added language attribute; a printer that prints print data; and a print control device that includes a print data receiving unit that receives print data from the host, a character code conversion unit that converts the first character code to a second character code for the printer corresponding to the language attribute, a command generating unit that generates a print instruction command adding a change character code command, which changes a character code of the printer according to the language attribute, before the converted character code output from the character code conversion unit, and a command transmission unit that transmits the print instruction command to the printer.

Another aspect of the invention is a printer having a print data receiving unit that receives print data containing a first character code with an added language attribute from a host; a character code conversion unit that converts the first character code to a second character code for the printer corresponding to the language attribute; a command generating unit that generates a print instruction command adding a change character code command, which changes a character code of the printer according to the language attribute, before the converted character code output from the character code conversion unit.

This aspect of the invention provides a printing system or printer for which an application programmer can create a printing program without knowing the character code set installed in the printer even when using a host that operates on a driverless platform.

The following configuration can also be used. In the foregoing print control device, plural printers can be connected, printer selection information specifying a printer for printing is added to the print data transmitted from the host, and the command transmission unit transmits the print instruction command to the printer specified by the printer selection information. This aspect of the invention enables applying the invention in a network environment having plural printers connected. Furthermore, because the print control device handles character code conversion, the plural printers can include a mixture of different models with different installed character sets. When a printer is replaced, it can also be replaced with a different model.

The foregoing print control device preferably also has a printer information acquisition unit that gets printer information including information related to the model or installed characters of the printer, from each connected printer, and a printer information storage unit that stores the printer information, and the character code conversion unit does not convert the first character code when the language attribute added to the first character code is incompatible with the model or installed characters of the printer specified by the printer selection information.

This aspect of the invention converts character codes only when the language attribute added to the first character code is compatible with the model or installed characters of the printer specified by the host. As a result, sending character codes to an incompatible printer and being unable to get the correct printout can be prevented. Note that when the language attribute added to the first character code is incompatible with the installed characters of the specified printer, printing based on the print data containing the first character code could be stopped. In this event, notice that printing was stopped is preferably sent to the host.

Further preferably in the foregoing print control device, the print data receiving unit receives print data including image data with attributes specifying a color mode and image size added; a validation unit validates the image data based on the color mode and image size; the command generating unit converts the image data to a control command corresponding to the color mode and generates an image print command if the image data is validated; and the command transmission unit transmits the image print command to the printer.

Because the print control device in this aspect of the invention receives print data including image data with attributes specifying a color mode and image size added, and converts the image data to a control command for a printer compatible with the color mode, the print control device can handle differences in commands that differ according to the color mode or image format even when using a host that operates on a driverless platform. The application programmer can therefore cause images to be printed without knowing the command system of the printer. Furthermore, because the image data is validated based on color mode and image size, invalid image data can be eliminated and highly reliable print results can be obtained.

This configuration is suitable to implementations using a host that operates on a driverless platform.

Further preferably in the foregoing print control device, the print data is written in markup language; and the validation unit determines the image data is valid if the data size of the image data equals the product of the image size times the data size per pixel corresponding to the color mode.

This aspect of the invention enables easily and reliably validating image data. Furthermore, because the host writes the print data in a widely compatible markup language, the host platform is not important. For example, the host could be a tablet computer, embedded device, or other device that operates on a driverless platform.

Note that the print data could be evaluated by a markup schema before validation by the validation unit. This configuration can achieve even more reliable print results by using two-stage data validation.

In a print control device according to another aspect of the invention, the image size and color mode are written as attributes of an element in the markup language, and the image data is written as content of an element.

This aspect of the invention writes the image size and color mode, and the image data, using the relationship between element attributes and content, and can therefore simply describe print data that has a complex structure.

The following configurations are also conceivable.

In the print control device described above: the command generating unit generates a pre-printing command with a status acquisition command that acquires the printer status added after the blank print data before generating the image print command when image data is sent from the host; the command transmission unit transmits the pre-printing command to the printer; a print interrupt process unit executes a print interrupt process when the printer is determined unable to print based on the response to the pre-printing command; and the print interrupt process includes a process that reports a print interruption to the transmission source of the print data, and a process that stops transmission of the image print command to the printer.

This configuration enables determining if the printer is capable of printing before starting to print. The print interrupt process can therefore be executed easily when the printer cannot print. Because interruption of printing is also reported to the host, the state of the printer can be known on the host side.

Note that the print interrupt process is preferably also executed when plural printers are connected and the printer specified by the host does not exist.

In the print control device described above, the host has a browser control unit that runs a web browser, the print control device has an HTTP server, and the host generates image data using a script or plugin that runs on the web browser and sends a print request via HTTP to the print control device.

Because the web browser generates the print data, this aspect of the invention enables applying the invention to cloud computing.

A printing system according to another aspect of the invention includes a host that transmits print data including image data with attributes specifying the color mode and image size added; a printer that prints print data; a print data receiving unit that receives print data from a host; a validation unit that validates the image data based on the color mode and image size; a command generating unit that converts the image data to a control command corresponding to the color mode and generates an image print command if the image data is validated; and a command transmission unit that transmits the image print command to the printer.

This aspect of the invention provides a printing system for which an application programmer can create an image printing program without knowing the command system of the printer even when using a host that operates on a driverless platform.

The following configurations can also be used.

When the data length of the image print command exceeds a specific length, the command generating unit of the print control device preferably segments the image data and generates plural image print commands. When the print interrupt process is executed because the printer cannot print, for example, this aspect of the invention enables easily executing the process. For example, if the image print command includes information denoting the data length and the command system, and printing is stopped after starting to transmit a long command, dummy data must be sent continuously in order to terminate that command (in order to print the specified data length), wasting time and printing paper, but this waste can be suppressed by segmenting the image data.

Further preferably in the foregoing print control device, the command generating unit adds a move print position command that moves the print position before each of plural image print commands. This configuration enables aligning the print position vertically even when the print mode is set to a mode such as the page mode in which the print position is not moved by printing an image. Note that a page mode denotes a mode in which print data is buffered for a defined print area and printed in a batch at one time.

Further preferably, the command generating unit of the print control device adds an initialization command with dummy data of at least a specific length exceeding the capacity of the printer buffer before the image print command. This enables completing and processing any command that was interrupted by a preceding print interrupt process. More specifically, when a clear buffer command, which is a real-time command that clears the buffer, is stored in the printer buffer by the preceding print interrupt process, the buffer is filled by the dummy data, and the current printing process can be processed normally.

Further preferably in the foregoing print control device, the print interrupt process includes a process that sends a clear buffer command, which is a real-time command that clears a printer buffer, to the printer. This aspect of the invention can process the next print job normally even when the previous print job did not end normally and a command remains in the printer buffer.

Further preferably, the foregoing print control device can connect to plural printers, printer selection information specifying a printer for printing is added to the print data transmitted from the host, and the command transmission unit transmits the image print command to the printer specified by the printer selection information. This aspect of the invention enables applying the invention in a network environment having plural printers connected. Furthermore, because the print control device handles differences in color mode and image format, the plural printers can include a mixture of different models with different command systems. When a printer is replaced, it can also be replaced with a different model.

The foregoing print control device preferably also has a printer information acquisition unit that gets printer information including information related to the model or color mode of the printer, from each connected printer, and a printer information reporting unit that reports the acquired printer information for the printers to the host; and the host displays the reported printer information for each printer, and the printer to use for printing is selected from the displayed printer information.

This aspect of the invention can provide a printer information acquisition and reporting means, and a printer selection means, to the host. More specifically, the host does not need to execute these processes.

In the print control device described above, the host has a browser control unit that runs a web browser, the print control device has an HTTP server, and the host generates print data using a script or plugin that runs on the web browser and sends a print request via HTTP to the print control device.

Because the web browser generates the print data, this aspect of the invention enables applying the invention to cloud computing.

Further alternatively, by providing the print control device with an HTTP server, and using a web service to handle processing, the host environment can be rendered as a native application.

A printing system according to another aspect of the invention includes a host that transmits print data written in markup language; a print control device including a print data receiving unit that receives the print data, a command generating unit that adds an initialization command to the print data and generates a print instruction command, and a command transmission unit that transmits the print instruction command; and a printer including a receiving unit that receives a print instruction command transmitted from the command transmission unit, and a print unit that prints based on the print instruction command.

Preferably, the host has a pre-print data transmission unit that transmits specific print data (blank print data) by HTTP to the print control device using a script or plugin that operates in a web browser. Further preferably, the command generating unit of the print control device generates a pre-printing command adding a status acquisition command that acquires the printer status to the specific print data transmitted from the host; the command transmission unit transmits the pre-printing command to the printer; and the print control device has a response acquisition unit that acquires a response to the pre-printing command from the printer, and a response return unit that returns the response to the pre-printing command to the host.

Because the print control device generates and sends to the printer a blank print command by adding a status acquisition command to blank print data sent from the host with this configuration, the host can know the status of the printer based on the response from the printer to the blank print command (status acquisition command). More specifically, when the host runs a web browser, and uses a printer that operates with print control commands such as ESC/POS® commands in a cloud computing environment using an HTTP server on the print control device, the host can be told that the printer is offline even when the printer is offline. Existing printers can therefore be used in a cloud computing environment while maintaining the current command system.

In the foregoing printing system, the command generating unit preferably adds an initialization command to the pre-print data.

This aspect of the invention adds an initialization command before the blank print data, and can therefore control a printer using a print control command even when hosts and printers are connected many-to-one or many-to-many. Furthermore, because a status acquisition command is added after the blank print data, the host can be informed when the blank print data is correctly processed.

In the foregoing printing system, the print control device preferably has a print interrupt process unit that executes a print interrupt process when the printer is determined unable to print based on the response to the pre-printing command; and the print interrupt process includes a process that sends a clear buffer command that clears a buffer of the printer to the printer.

This aspect of the invention can process the next print job normally even when the previous print job did not end normally and a command remains in the printer buffer.

Note that the print interrupt process is preferably also executed when plural printers are connected and the printer specified by the host does not exist.

In a printing system according to another aspect of the invention, the host transmits the specific print data at a predetermined timing to the print control device.

This aspect of the invention enables the host to acquire the status at predetermined times, such as when the power turns on or a specific application starts. More specifically, by regularly transmitting blank print data, the host can always know the printer status.

The following configuration can also be used. In the foregoing printing system, the print control device can connect to plural hosts, and of the plural hosts, the response return unit preferably responds to the host that was the transmission source of the blank print data. This aspect of the invention enables only the host that transmitted the blank print data in the group of plural hosts to know the status of the printer. That is, the other hosts do not unnecessarily receive the result of printing the transmitted print data.

In the foregoing printing system, the initialization command includes an ASB (Auto Status Back) enable command that enables the ASB status function whereby the printer automatically returns status information that is automatically transmitted from the printer; a response acquisition unit that acquires the status sent from the printer from transmission of the blank print command until a response to the status acquisition command is received; and the response return unit transmits the newest status acquired by the response acquisition unit with the print result to the host that transmitted the print data. This aspect of the invention enables the host to know the latest status of the printer.

Further preferably in the foregoing printing system, the print control device also has a printer information acquisition unit that gets printer information, which is information related to each printer, from each connected printer, and a printer information reporting unit that reports the printer information acquired for each printer to a plurality of hosts; and the host has a printer information display unit that displays printer information reported for each printer, and a printer selection unit that selects the printer to process the blank print data from the printer information displayed for each printer. This aspect of the invention provides a printer information acquisition means, and a printer selection means, to the host. More specifically, the host does not need to execute these processes.

BRIEF DESCRIPTION OF DRAWINGS

FIG. 1 is a system configuration diagram of a printing system according to a preferred embodiment of the invention.

FIG. 2 (a) is a control block diagram of a web application server, and FIG. 2 (b) is a control block diagram of a host.

FIG. 3 is a control block diagram of a printer with an intelligent function.

FIG. 4 shows implementation layers of the print control device.

FIG. 5 is a function block diagram of a printing system according to a first embodiment of the invention.

FIG. 6 (a) shows a command sequence of a print instruction command according to the first embodiment of the invention, and FIG. 6 (b) shows the command sequence of a pre-printing command.

FIG. 7 is a flow chart showing the flow of print control according to the first embodiment of the invention.

FIG. 8 is a function block diagram of a printing system according to a second embodiment of the invention.

FIG. 9 shows the command sequence of a blank print command according to the second embodiment of the invention.

FIG. 10 is a function block diagram of a printing system according to a third embodiment of the invention.

FIG. 11 (a) shows the relationship between printer language specifications, installed character sets, and character codes, and FIG. 11 (b) shows the relationship between language attributes and change character code commands.

FIG. 12 shows the command sequence of the print instruction command according to the third embodiment of the invention.

FIG. 13 shows an example of print data according to the third embodiment of the invention.

FIG. 14 (a), FIG. 14 (b), and FIG. 14 (c) shows the result of printing the print data shown in FIG. 13 with Japanese, Korean, and ANK language printers, respectively.

FIG. 15 is a flow chart showing steps in printing control according to the third embodiment of the invention.

FIG. 16 is a function block diagram of a printing system according to a fourth embodiment of the invention.

FIG. 17 (a) shows the data sequence of a raster graphic command, and FIG. 17 (b) shows the data sequence of a bit image command.

FIG. 18 (a), FIG. 18 (b), FIG. 18 (c), and FIG. 18 (d) respectively show the command sequence of print instruction commands for the normal mode, monochrome, no segments; normal mode, monochrome, with segments; page mode, monochrome, no segments; and page mode, monochrome, with segments.

FIG. 19 (a), FIG. 19 (b), FIG. 19 (c), and FIG. 19 (d) respectively show the command sequence of print instruction commands for the normal mode, gray scale, no segments; normal mode, gray scale, with segments; page mode, gray scale, no segments; and page mode, gray scale, with segments.

FIG. 20 (a), FIG. 20 (b), FIG. 20 (c), and FIG. 20 (d) respectively show the command sequence of print instruction commands for the normal mode, color, no segments; normal mode, color, with segments; page mode, color, no segments; and page mode, color, with segments.

FIG. 21 shows an example of print data according to the fourth embodiment of the invention.

FIG. 22 (a) shows an example of an image file, and FIG. 22 (b) and FIG. 22 (c) respectively show the results of printing the print data in FIG. 21 using a printer that is compatible with monochrome printing, and a printer compatible with monochrome and 4-bit gray scale printing.

FIG. 23 is a flow chart of printing control according to the fourth embodiment of the invention.

FIG. 24 (a) shows the configuration of a system in which a printer with an intelligent function is the master, and a plurality of printers without the intelligent function are slaves; and FIG. 24 (b) shows the configuration of a system in which a plurality of print control devices share a plurality of printers.

DESCRIPTION OF EMBODIMENTS

A printing system SY according to the present invention is described below with reference to accompanying figures. A print application and printer driver written for the OS (operating system) of the terminal device normally must be installed in order to print from a tablet computer or smartphone. In contrast, the printing system SY according to the invention installs an XML (Extensible Markup Language) web service print function (print control device) that is equivalent to a printer driver in the printer, and thereby enables printing independently of the OS. More specifically, the printer can be operated using a web browser without installing a dedicated printer driver on the host. Below, a printer having this XML web service print function is called an "intelligent printer." In contrast, a printer not having this XML web service print function is simply called a printer.
General Configuration Before describing the individual embodiments, the general configuration of the printing system SY is described with reference to FIG. 1 to FIG. 4. FIG. 1 is a system configuration diagram of the printing system SY. This printing system SY has a web application server 10, a plurality of hosts 20 (host A, host B), a print control device 31, and a plurality of printers 32 (printer A, printer B). Note that the print control device 31 and one printer 32 (printer A) are included in the printing system SY as an intelligent printer 30. As a result, printer A and printer B are in a master-slave relationship.

The web application server 10 and hosts 20 are connected over the Internet or other network. The hosts 20 and print control device 31 are connected over a wired or wireless LAN or other network. The host 20 is a POS (point of sale) terminal installed at the checkout register in a retail business, for example. The intelligent printer 30 and printer 32 are, for example, receipt printers that print sales receipts, or kitchen printers installed in a kitchen.

The control configuration of the web application server 10, hosts 20, and intelligent printer 30 is described next with reference to FIG. 2 and FIG. 3. FIG. 2 (a) shows the control configuration of the web application server 10. The web application server 10 includes a control unit 11, communication unit 12, storage unit 13, and other hardware components not shown that are generally included in a computer. The control unit 11 is embodied by a CPU (central processing unit), ROM (read only memory), and RAM (random access memory). The storage unit 13 is a HDD (hard disk drive), for example, and stores a HTTP server 15 and web application 16.

The communication unit 12 is an interface for communicating with the host 20 (web browser 27). Communication between the web application server 10 and host 20 is controlled by the HTTP server 15 using Hypertext Transfer Protocol (HTTP). More specifically, the web application server 10 receives an HTTP request from the host 20 (web browser 27), and based on the URL (Uniform Resource Locator) contained in the HTTP request, sends a web page 40 (see FIG. 1) provided by the web application 16 to the host 20.

A page control script (JavaScript®)) for controlling the web page 40, and a print control script (JavaScript®)) for controlling printing, embedded in the web page 40. The host 20 executes a printing process by running the print control script through the web browser 27 (on the web page 40).

FIG. 2 (b) shows the control configuration of the host 20. The host 20 has a control unit 21, display unit 22, communication unit 23, storage unit 24, and operating unit 25. The control unit 21 includes a CPU, and controls host 20 operation.

The display unit 22 displays a web page 40 acquired (downloaded) by the web browser 27 in the web browser 27, and displays windows for reporting events accompanying operations performed in the web browser 27, and windows for configuring settings. The operating unit 25 is used for performing operations including issuing printing instructions on a web page 40 displayed by the web browser 27. For example, when the host 20 is a POS terminal and the web application 16 is a POS application, the results of reading barcodes (the name, price, and quantity of purchased products, for example) and transaction results are displayed as a web page 40. A print command is also issued by pressing a transaction key on the host 20 (operating the operating unit 25). Note that the display unit 22 and operating unit 25 can be configured as separate hardware devices or together as a touch panel.

The communication unit 23 is an interface for communicating with the web application server 10 and print control device 31. As described above, the host 20 uses the web browser 27 to communicate with the web application server 10 and print control device 31.

The storage unit 24 is a hard disk drive, for example, and stores the web browser 27. In this embodiment a simple browser (standard browser) that does not support plugin modules is used as the web browser 27. The control unit 21 uses this web browser 27 to access the web application server 10 through the communication unit 23, and acquire a web page 40 provided by the web application 16.

The web page 40 includes a page control script and print control script as described above. When the web browser 27 receives a print instruction from the user through the page control script embedded in the web page 40, the web browser 27 executes the print control script embedded in the same web page 40, and generates and sends print data written in XML to the print control device 31.

Note that the host 20 is a computer on which the web browser 27 runs, and may be a POS terminal, tablet computer, smartphone, personal computer, or other type of device. In addition, because the host 20 is driverless as described above, any operating system can be used. A plurality of hosts 20 that operate on different platforms can therefore coexist in the same printing system SY.

FIG. 3 shows the control configuration of the intelligent printer 30. As described above, the intelligent printer 30 combines the print control device 31 and a printer 32. The print control device 31 in this embodiment is an interface board that is removably installed in the printer 32. The print control device 31 could alternatively be a discrete control box that is externally attached (connected) to the printer 32.

The print control device 31 has a control unit 41, board interface 42, storage unit 43, and communication unit 44. The control unit 41 includes a CPU and controls operation of the print control device 31. The board interface 42 communicates with the printer 32 (printer interface 55). The storage unit 43 is nonvolatile memory (such as flash ROM), for example, and stores an HTTP server 46 and printer list 47. The printer list 47 is a list of printer information 57 for each printer 32. The print control device 31 communicates with each connected printer 32 (printer A, printer B), and acquires and stores printer information 57 such as model, installed character set, color mode, and image format information in the printer list 47.

The communication unit 44 communicates with the host 20 and other printer 32 (printer B), and is an interface group including a LAN interface and a USB interface, for example. Communication between the print control device 31 and host 20 (web browser 27) is handled by the HTTP server 46 using HTTP. More specifically, when print data is sent from the host 20 to the service endpoint address (a URL such as http://x.x.x.x/) uniquely assigned to the print control device 31, the print control device 31 receives the print data.

The print control device 31 converts the received print data (XML document) to the print control command system (ESC/POS® commands) for the printer 32, and outputs to the printers 32. The print control command is in the format ESC (xn . . . ) where n denotes the data length, for example. The printer ID (printer selection information) of the printer 32 selected for printing is also included in the service endpoint address. The print control device 31 sends the print control command addressed to the printer 32 identified by the printer ID. Note that when a crossdomain (crossOrigin) request is received from the print control script running on the web browser 27 of the host 20, the print control device 31 responds (XML document) to allow the request.

The printer 32 has a control unit 51, storage unit 52, print mechanism 53, buffer 54, and printer interface 55. The control unit 51 includes a CPU and controls printer 32 operation. The storage unit 52 stores the printer information 57 (including the printer 32 model, installed characters, color mode, and image format). The print mechanism 53 includes the printhead, paper feed mechanism, and paper cutter mechanism, and performs print operations as controlled by the control unit 51. Note that the printing method could be an inkjet, laser, or other type of printing method.

The buffer 54 is a receive buffer that temporarily stores received data (print control commands). The print mechanism 53 sequentially reads and prints the data stored in the buffer 54. The printer interface 55 communicates with the print control device 31 (board interface 42). The printer 32 prints based on print control commands received from the print control device 31 through the printer interface 55. The printer 32 also outputs the result of printing through the printer interface 55 to the print control device 31. When a status acquisition command is sent as the print control command, the printer 32 detects and sends the internal state (status) of the printer to the print control device 31. The print control device 31 then converts the printing result and status (command response) to an XML document, and returns the XML document to the host 20.

The implementation layers of the print control device 31 are described next with reference to FIG. 4. From the bottom up, the implementation layers of the print control device 31 include hardware, the operating system, the web server (HTTP server 46), and a plurality of web service print functions (XML web service print function) and a device registration web application on the top layer.

A print web service is a function that includes converting from XML documents to print control commands, and is an important part of this embodiment. By providing a plurality of print web services, a plurality of processes can be executed in parallel, including receiving print data from a plurality of hosts 20 and printing from a plurality of printers 32, and returning print results from each printer 32 to the host 20 that sent the print data. For example, because there are ten print web service processes in the example shown in the figure, ten processes (threads) can be processed simultaneously. However, when data for plural print jobs is sent to a single printer 32, the print jobs are processed in the order in which printing permission is received (the order in which the printer port is acquired).

The device registration web application is an application that registers the printer ID, model, and port information (IP address) of a printer 32. This information is registered by presenting a configuration page (web page) provided by the HTTP server 46 on the web browser 27 for the user to input the information using the operating unit 25. The registered information is then stored in the printer list. 47 (see FIG. 3).

Embodiment 1

A first embodiment of the invention is described next with reference to FIG. 5 to FIG. 7. This first embodiment is directed to controlling a printer 32 using print control commands (ESC/POS® commands) intended for a one-to-one connection even when hosts 20 and printers 32 are connected many-to-one or many-to-many. The following description focuses on the configuration for solving the foregoing problem.

FIG. 5 is a function block diagram of a printing system SY1 according to the first embodiment of the invention. As shown in the figure, the main functions of the host 20 include a browser control unit 71, print data generation unit 72, print data transmission unit 73, response receiving unit 74, printer information display unit 75, and printer designation unit 76.

The browser control unit 71 controls the web browser 27. The print data generation unit 72 generates print data written in XML using a print control script that runs on the web browser 27. The print data transmission unit 73 adds a printer ID to the generated print data, and outputs to the print control device 31. Note that the printer ID is added based on the printer select ion output by the printer designation unit 76.

The response receiving unit 74 receives the print result and status of the printer 32 from the print control device 31 as an XML document. The printer information display unit 75 displays the printer information 57 for each printer 32 received from the print control device 31 on the display unit 22. The printer designation unit 76 designates the printer 32 to be used for printing based on the printer information 57. More specifically, the user determines and selects a desired printer 32 using the operating unit 25 with reference to the displayed printer information 57.

The main functions of the print control device 31 include a print data receiving unit 81, command generating unit 82, command transmission unit 83, response acquisition unit 84, response return unit 85, print interruption processing unit 86, printer information acquisition unit 87, printer information storage unit 88, and printer information reporting unit 89.

The print data receiving unit 81 receives print data written in XML from the host 20. The command generating unit 82 generates a print control command including a print instruction command and pre-printing command. The print instruction command is a command based on the print data sent from the host 20, and the pre-printing command is a command that is generated to check the status of the printer 32 before generating the print instruction command. The command transmission unit 83 sends the generated print instruction command to the printer 32.

FIG. 6 (a) shows an example of the command sequence of the print instruction command in this first embodiment of the invention. As shown in the figure, the print instruction command adds an initialization command and a status acquisition command respectively before and after the print data.

The initialization command includes dummy data (NUL data), a settings initialization command, and an ASB enable command (enable command). The dummy data is a blank file that is longer than the capacity of the printer 32 buffer 54. This enables complementing a command that was interrupted by an immediately preceding print interrupt process for processing by the printer 32. The settings initialization command is a command that initializes printer 32 settings. Note that the dummy data is preferably added before the settings initialization command.

The ASB enable command is a command that enables the ASB (Auto Status Back) function whereby the printer 32 automatically returns the printer status. When the ASB function is enabled, the printer 32 automatically sends ASB status reports indicating change in a particular printer state (such as a cover opening/closing, no paper, printing completed). This enables the print control device 31 to know changes in the status of the printer 32 during printing. Note that the ASB function of the printer 32 is disabled after the initialization command is received, after receiving an ASB disable command, and in the initial state immediately after printer 32 power turns on.

FIG. 6 (b) shows the command sequence of the pre-printing command. The pre-printing command is a command that is generated to check the status of the printer 32 before generating a print instruction command after print data is sent from the host 20. This command sequence adds a status acquisition command after a print control command for blank print data. The status acquisition command is a command that gets the status of the printer 32, and denotes a status transmission command or a process ID response command (a command that returns a specific ID when the preceding printing process ends). Note that the printer 32 status denotes status information such as whether paper is loaded in the printer, the on-line/off-line state, the remaining ink or toner level, and the reserve power in the battery. By sending this pre-printing command before sending a print instruction command based on the print data, the print interrupt process can be easily executed if the printer 32 is unable to print.

Referring again to FIG. 5, after the pre-printing command is sent, the response acquisition unit 84 gets a response to the status acquisition command from the printer 32 based on the status acquisition command contained in the pre-printing command. After sending the print instruction command, the response acquisition unit 84 also acquires the ASB status reports that are sent automatically from the printer 32 based on the ASB enable command contained in the print instruction command during the period from sending the print instruction command to receiving a response to the status acquisition command. After the printing process, the response to the status acquisition command is acquired from the printer 32 based on the status acquisition command contained in the print instruction command. The response return unit 85 then sends the print result based on the received response to the host 20 that sent the print data. This print result denotes an XML document that indicates if printing succeeded or failed. Note that an XML document describing response content (the status of the printer 32) could be returned instead of the print result. The response return unit 85 also returns XML documents indicating the most recent status to the host 20 until a response to the ASB enable command (a response to the status acquisition command) is received from transmission of the print instruction command.

If the printer 32 is determined unable to print based on the response acquired by the response acquisition unit 84, the response acquisition unit 84 times out waiting for a response, or the printer 32 specified by the host 20 does not exist, the print interruption processing unit 86 executes a print interrupt process. In addition to a process of informing the host 20 that sent the print data that printing was interrupted, the print interrupt process includes as necessary a process that stops sending print instruction commands to the printer 32, and a process that sends a clear buffer command, which is a real-time command that clears the printer 32 buffer 54, to the printer 32. A real-time command denotes a command that commands immediate execution by the printer 32.

The printer information acquisition unit 87 acquires the printer information 57 for each printer 32 from each connected printer 32 (printer A, printer B). This printer information 57 can be acquired on a regular schedule, or when the power turns on or an information acquisition command is received from the host 20. The printer information storage unit 88 stores the acquired printer information 57 for each printer 32 as a printer list 47. The printer information reporting unit 89 also supplies this printer list 47 to the host 20 (reports the printer information 57 for each printer 32). Note that the printer list 47 may be provided whenever printer information 57 is received, when the power turns on, or when a report command is received from the host 20.

The main functional components of the printer 32 include a command receiving unit 91, print unit 92, response transmission unit 93, and printer storage unit 94. The command receiving unit 91 receives ESC/POS® commands such as the print instruction command and pre-printing command from the print control device 31. The print unit 92 prints on printing paper based on the received commands. The response transmission unit 93 returns responses to the print instruction command and pre-printing command to the print control device 31. The printer storage unit 94 is equivalent to the storage unit 52 (see FIG. 3), and stores the printer information 57 for that printer.

Print control in this first embodiment of the invention is described next with reference to the flow chart in FIG. 7. When print data is received from the host 20 (S01), the print control device 31 generates a pre-printing command and checks the status of the printer 32 (802). If the print control device 31 determines the printer 32 cannot print based on the received result (S03 returns No), the print control device 31 returns the status to the host 20 (S04). If the print control device 31 determines the printer 32 can print (S03 returns Yes), the print control device 31 generates a command sequence (print instruction command) (S05), and outputs to the printer 32 (S06).

When an ASB status report or reply (response) is received from the printer 32 (S07), the print control device 31 determines if printing was interrupted or a timeout occurred (S08), and if the result is No, determines if printing is completed (S09). If printing is not completed (S09 returns No), control returns to step S07; if printing is completed (S09 returns Yes), the status and print result are returned to the host 20 (S04). If Yes is returned in S08, the print control device 31 sends a clear buffer command to the printer 32 (S10), and returns the status and print result to the host 20 (S04, reports a print interrupt).

As described above, by adding an initialization command before the print data sent from the host 20, this first embodiment of the invention can control printers 32 in a many-to-one or many-to-many network environment using ESC/POS® commands designed for a 1:1 connection between host 20 and printer 32. More specifically, even when a previous print job based on a print command from host A does not end normally, the next print instruction command can be processed normally because an initialization command is added before the print instruction command based on a print command from host B. In addition, because the printer 32 is reinitialized by similarly adding an initialization command, the next print instruction command based on a print command received from host B can also be interpreted normally when a printer 32 setting has been changed by a command from host A. An existing printer 32 can therefore be shared by multiple hosts 20 while maintaining compatibility with an existing command system.

Furthermore, because the host 20 generates print data using a script that runs in a web browser 27, a printer driver or plugin is not required. In addition, because the platform of the host 20 does not matter, smartphones, tablet computers, and other hosts 20 that operate on different operating systems can coexist in the same printing system SY.

Note that a standard browser is used as the web browser 27, and print data is generated using a print control script in the foregoing first embodiment, but the print data can be generated using a plugin or a rich Internet application.

After step S01 in the flow chart in FIG. 7, the print data may also be validated (validation unit) by an XML schema (markup schema). In this implementation control preferably goes to step S02 if the print data is validated; and if the data is not validated, control goes to step S04 or S10, and the print interrupt process is executed. By using a markup schema, this implementation can execute the printing process after validating the print data.

In this first embodiment of the invention the print data is written in XML, but could be written in the command system (ESC/POS® commands) of the printer 32. In this implementation, command conversion by the print control device 31 is not necessary. The print result returned to the host 20 could also be a command response instead of an XML document. As a result, the host 20 must interpret the response data and extract the print result and status information. However, a configuration in which the print control device 31 handles interpretation and outputs to the host 20 after writing the print result and status information in XML or CSV notation is also conceivable.

Embodiment 2

A second embodiment of the invention is described next with reference to FIG. 8 and FIG. 9. The first embodiment described above returns status reports and other responses in response to receiving print data sent from a host 20, and this embodiment is characterized by returning status reports and other responses independently of receiving print data. Only the differences with the first embodiment are described below. Note that like parts in this embodiment and the first embodiment are identified by the same reference numerals, and further description thereof is omitted. In addition, variations that are applicable to like components of the first embodiment are likewise applicable to this embodiment.

FIG. 8 is a function block diagram of a printing system SY2 according to the second embodiment of the invention. As shown in the figure, this embodiment differs from the function configuration of the first embodiment by adding a blank print data generating unit 101 and a blank print data transmission unit 102 to the host 20.

The blank print data generating unit 101 generates blank print data using a print control script that runs in the web browser 27. The blank print data transmission unit 102 sends the generated blank print data to the print control device 31 by HTTP. This blank print data is a blank print request that is generated in order to get the status of the printer 32. For example, the blank print data is generated and sent when the user (using the operating unit 25) performs a status acquisition command operation on the printer 32. The acquired status information is then displayed on the display unit 22 of the host 20.

The command generating unit. 82 of the print control device 31 generates a blank print command based on the blank print data sent from the host 20. FIG. 9 shows the command sequence of the blank print command. As shown in the figure, the blank print command respectively adds an initialization command and status acquisition command before and after the blank print data. As in the first embodiment, the blank print command contains dummy data, a settings initialization command, and an ASB status enable command. The command transmission unit 83 then sends the generated blank print command to the printer 32, and the response acquisition unit 84 gets the response to the blank print command. The response return unit 85 also sends the response to the blank print command to the host 20.

Note that the blank print data transmission unit 102 could send the blank print data addressed to a particular printer 32, or it could broadcast the blank print data to all printers 32. In the latter event, a configuration that adds the printer ID (printer selection information) of all connected printers 32 to the blank print data, and a configuration that does not add the printer ID, are both conceivable. In the latter configuration, the print control device 31 broadcasts the blank print command generated based the blank print data to all printers 32 that are connected (can communicate).

Except for receiving blank print data from the host 20 in step S01 of the flow chart for the first embodiment shown in FIG. 7, the flow of print control in this second embodiment is the same and further description thereof is omitted.

As described above, because the print control device 31 in this second embodiment adds a status acquisition command to the blank print data sent from the host 20, and generates and sends a blank print command to the printer 32, the print control device 31 can report the printer 32 status to the host 20 based on the response from the printer 32. More specifically, the printer 32 status can be returned to the host 20 in the same way as when printing.

Note that the host 20 sends the blank print data when triggered by a status acquisition command operation of the user in this second embodiment, but the blank print data could also be sent when the host 20 power turns on, when a specific application starts, or at other predetermined times. In addition, by sending blank print data regularly, the host 20 can always know the status of the printer 32.

Embodiment 3

A third embodiment of the invention is described next with reference to FIG. 10 to FIG. 15. This third embodiment is directed to enabling an application programmer to write a printing program without knowing the character code sets installed in the printer 32 even when using a host 20 that operates on a driverless platform as described above. The differences with the first and second embodiments are described below.

FIG. 10 is a function block diagram of a printing system SY3 according to the third embodiment of the invention. As shown in the figure, this embodiment differs from the function configuration of the first embodiment by the addition of a character code conversion unit 111 in the print control device 31. The character code conversion unit 111 converts a universal character code such as Unicode (first character code) to a character code (second character code) specific to the printer 32. A character code for the printer 32 denotes a character code corresponding to font data installed in the printer 32 (such as dot matrix font data, bitmap font data, or scalable font data). In contrast, Unicode assigns a unique character code to each individual character. Because Unicode and printer 32 character codes are in a one-to-many relationship instead of a 1:1 relationship, code conversion by the character code conversion unit 111 is required. Details of this process are described below.

As shown in FIG. 11 (a), this third embodiment assumes that printer specifications and installed characters differ with the printer 32. For example, if printer A is a Japanese language printer, the character sets installed in the printer 32 are Western, international, and Japanese, and the character code set that is used is the kanji mode (Shift_JIS).

In the third embodiment, the host 20 (print data generation unit 72, print data transmission unit 73) generates and transmits print data containing one or more universal character codes with a language attribute. Though not shown in the figure, the host 20 enables inputting a string of characters to print, the language, and the font using a specific form displayed by the web browser 27, and generates the print data (an XML print document) based on this input. The character code conversion unit 111 also converts the universal character codes to character codes compatible with the language attribute. In addition, the command generating unit 82 generates a print instruction command using the converted output of the character code conversion unit 111.

FIG. 12 shows a command sequence for the print instruction command according to the third embodiment of the invention. As shown in the figure, the command generating unit 82 generates a print instruction command adding a change character code command for changing the character codes of the printer 32 according to the language attribute added before the character codes that were converted based on the language attribute (character codes for printer 32). Note that as in the first embodiment an initialization command could be added before the command sequence, and a status acquisition command could be added after the command sequence (see FIG. 6 (a)).

The change character code command conceptually includes a change character code table command, a change international character set command, and a change to kanji mode command, and in the ANK mode (a mode compatible with the ANK specification) can change characters in the character code range 80 to FF. A character code table denotes a table that stores a plurality of character codes for the printer 32. Therefore, information identifying the character code table can uniquely specify a character code of the printer 32 using information that identifies the address in the character code table. A change character code table command is a command that changes the character code table.

The change international character set command is a command that changes characters in the character code range 20H to 7EH in the ANK (Alphabet Numeric Kana) mode. This command is directed to different characters that are assigned to the same character code, such as the English backslash "¥" and Japanese currency symbol "¥", the English backslash "¥" and Korean won symbol, and the English backslash "¥" and "¥" in Chinese, and is used together with the change character code table command. The change kanji mode command is a command used to change from the ANK mode to the kanji mode, and to cancel the kanji mode and change to the ANK mode. Note that the printers 32 are printers in which international character sets for Japanese, Korean, and Chinese cannot coexist.

FIG. 11 (b) shows the correlation between language attributes and change character code command. Note that the language attributes "ja", "ko" "zn-cn", "zn-tw", "en" respectively correspond to printers 32 with Japanese, Korean, simplified Chinese, traditional Chinese, and ANK language mode specifications. For example, when universal character code kanji characters with the ja language attribute are included in the print data, the character code conversion unit 111 converts these kanji to the corresponding character codes in the Japanese language set. The command generating unit 82 also adds a change character code command for converting printer 32 character codes to kanji mode, character code table=katakana, Japanese character set=Japan, character=Shift_JIS.

The print control device 31 stores a printer list 47, which is a list of printer information 57 for each printer 32 (see FIG. 3). The control unit 11 references the printer list 47, and if the language attribute added to a universal character code corresponds to the model or the character set installed in the printer 32 designated by the printer ID (printer selection information), converts that universal character code, or in other words, does not convert the universal character code to which the language attribute was assigned if the specified language attribute does not match the printer 32 specifications. As a result, when the same print data is sent to plural printers 32 that differ by model or installed characters, different print results can be obtained according to the specifications of each printer 32. This is described further with reference to FIG. 14.

The print data generation unit 72 can also omit adding the language attribute as required. When a universal character code without a language attribute is contained in the print data sent from the host 20, the character code conversion unit 111 converts the universal character code based on the language attribute used immediately therebefore for conversion. More specifically, the last language attribute used is saved in volatile or nonvolatile storage. In this implementation the command generating unit 82 also omits the change character code command. As a result, the print data generation unit 72 can omit adding the language attribute when continuously printing character codes with the same language attribute. When a language attribute is not added, the command generating unit 82 omits adding a change character code command, and can therefore reduce the data size of the print instruction command sent to the printer 32.

Note that when a language attribute is not added to the universal character code, universal character codes can be converted based on the default language attribute (such as language attribute "en"=ANK mode) instead of the language attribute of the previous conversion. When the language attribute of the previous conversion has not been saved (such as in the first print job after the power turns on), conversion can be based on the default language attribute.

FIG. 13 shows an example of print data in the third embodiment. As shown in the figure, the print data generation unit 72 writes the print data in XML (markup language). The language attribute is written as an attribute of an element, and the universal character code is written as content of the element. FIG. 14 shows print results based on the print data shown in FIG. 13. For example, FIG. 14 (*a*) shows the print result when printing the print data in FIG. 13 using a Japanese language printer 32. More specifically, of the universal character codes C1 to C10 in FIG. 13, the universal character codes C1 to C7 corresponding to installed characters supported by the Japanese printer 32 are printed. FIG. 14 (*b*) similarly shows the print result when printing with a Korean language printer 32, and the universal character codes C1 to C6 and C8 that are supported by the Korean printer 32 are printed. FIG. 14 (*c*) similarly shows the print result when printing with an ANK mode printer 32, and the universal character codes C1 to C6 that are supported by the ANK printer 32 are printed.

The flow of printing control in this third embodiment of the invention is described next referring to the flow chart in FIG. 15. When print data is received from the host 20 (S21), the print control device 31 gets the combinations of language attributes and universal character codes contained in the print data (S22). Based on the language attributes, the print control device 31 converts the universal character codes to character codes for the printer 32 (S23), and generates a command sequence (print instruction command) (S24). Finally, the print control device 31 sends the generated command sequence to the printer 32 (S25).

As described above, because this third embodiment of the invention receives print data including universal character codes with an added language attribute from the host 20, converts the universal character codes to character codes corresponding to the language attribute, and sends the converted character codes with a change character code command to the printer 32, the application programmer does not need to know the character code sets installed in the printer 32. For example, in the case of Unicode characters, there may be plural printer 32 character codes that correspond to a single universal character code, but conversion to the correct character code is possible because a language attribute is added.

Furthermore, because the print control device 31 handles character code conversion, plural printers 32 of different models and installed character sets can be connected. Plural models can therefore coexist as slave devices. For example, a configuration in which the printer 32 (receipt printer) installed at a checkout register prints in Japanese while the printer 32 (kitchen printer) installed in the kitchen prints in Chinese is conceivable. When a printer 32 is replaced, it can also be changed to a different model.

Note that because the configuration of the third embodiment can convert character codes without requiring a printer driver, this embodiment is well suited to using a host 20 that operates on a driverless platform. More specifically, as described above, in addition to a configuration that uses a print control script running on a web browser 27, this embodiment is also suited to configurations that use a web browser 27 plugin, and configurations in which an electronic device such as a built-in device or tablet to which the driver concept does not apply is used as the host 20.

When the language attribute added to a universal character code is not compatible with the installed characters of the designated printer 32, the third embodiment described above ignores that universal character code, but printing the print data containing that universal character code could be stopped. In this implementation, when print data containing plural different language attributes is sent as shown in FIG. 13, all of the printers 32 of the specifications shown in FIG. 11 (*a*) are unable to print. The host 20 is also preferably informed when printing is interrupted.

Embodiment 4

A fourth embodiment of the invention is described next with reference to FIG. 16 to FIG. 23. This fourth embodiment is directed to enabling an application programmer to write an image printing program without knowing the command system (color mode and image format differences) of the printer 32 even when using a host 20 that operates on a driverless platform as described above. The differences with the first to third embodiments are described below.

FIG. 16 is a function block diagram of a printing system SY4 according to the fourth embodiment of the invention. As shown in the figure, this embodiment differs from the function configuration of the first embodiment by the addition of a validation unit 121 in the print control device 31. The validation unit 121 validates image data sent from the host 20.

The fourth embodiment is based on each printer 32 being compatible with a specific command. For example, printer A may be compatible with bit image commands while printer B is compatible with monochrome image print commands. The command system of the printer 32 is described here briefly. Print control commands used when printing images include color commands such as a monochrome image print command, gray scale print command, and color image print command, and image format commands such as a raster graphic command and bit image command. Color commands are used according to the color mode of the printer 32. Image format commands are used according to differences in the data sequence as shown in FIG. 17. As shown in FIG. 17 (a), a raster graphic command is used when the data is arranged in the scanning direction, and a bit image command is used when the data is arranged in vertical rows as shown in FIG. 17 (b).

The commands (color mode and image format) supported by each printer 32 are stored in the printer list 47 of the print control device 31. As a result, the print control device 31 appropriately converts image format commands (from a raster graphic command to a bit image command, or vice versa) according to the image format supported by the designated printer 32.

In this fourth embodiment of the invention, the host 20 (print data generation unit 72, print data transmission unit 73) generates and sends print data containing image data to which attributes specifying the color mode and image size are added. The image data is binary data encoded in Base64.

Though not shown in the figure, the host 20 enables specifying the image file, and specifying the color mode and color, using a specific form displayed by the web browser 27, and generates the print data (an XML print document) based on this input. Note that the image size (information indicating the width and height of the image) is effectively specified by specifying the image file, but a configuration in which the image file and image size are separately set, and the image file is enlarged or reduced according to the image size, is also conceivable. The color setting is also a type of color mode, and in a 2-color printer that prints black and red, determines whether a monochrome image is printed black or red.

The blank print data transmission unit 102 validates the image data based on the attributes specifying the color mode and image size contained in the image data. The color mode is the method of managing image color information, and includes 2-level monochrome, gray scale, RGB, and CMYK. The amount of data per pixel is also determined by the color mode, and is 1 bit for 2-level monochrome, 4 bits for gray scale (16 level), 8 bits for gray scale (256 level), 24 bits for RGB, and 32 bits for CMYK.

The validation unit 121 validates the image data if the data size of the image data equals the product of the data size per pixel (1 dot) corresponding to the color mode, and the image size. For example, a 256-level gray scale (8 bits/pixel) raster graphic requires a byte length equal to the width times height pixel count. More specifically, an image 5 wide by 5 high requires a data length of 25 bytes. A 16-level gray scale (4 bits/pixel) raster graphic with line padding for byte alignment requires a byte length equal to the (width+1)/2 times height pixels (where the decimal portion of the quotient is truncated). More specifically, an image 5 wide by 5 high padded to 6 wide by 5 high requires a data length of 6/2×5=15 bytes. A 2-level monochrome (1 bit/pixel) raster graphic with line padding for byte alignment requires a byte length equal to the (width+7)/8 times height pixels (where the decimal portion of the quotient is truncated). More specifically, an image 5 wide by 5 high padded to 8 wide by 5 high requires a data length of 8/8×5=5 bytes.

When the image data has been validated by the validation unit. 121, the command generating unit 82 in the fourth embodiment converts the image data to control commands for a printer 32 compatible with the color mode, and generates an image print command. The command transmission unit 83 sends the generated image print command to the printer 32.

The command generating unit 82 in this embodiment also executes the following process. For example, when the data length of the image print command exceeds a specific length, the command generating unit 82 segments the image data and generates plural image print commands. This limits the data length of the image print command and thereby facilitates executing the print interrupt process. When plural image print commands are generated, the command generating unit 82 adds a move print position command that moves the print position vertically (the receipt conveyance direction=secondary scanning direction of raster graphic command) before each image print command. This enables aligning the print position vertically even when the print mode of the printer 32 is set to the page mode (a print mode in which the print position is not moved by image printing). The command generating unit 82 also adds an initialization command with dummy data of at least a specific length exceeding the capacity of the printer 32 buffer 54 at the beginning of the command sequence (before the image print command). This enables completing any command that was interrupted by a preceding print interrupt process for processing by the printer 32. The command generating unit 82 also appropriately executes other image conversion operations according to the specified color mode, such as converting color or gray scale image data to monochrome.

The print modes of the printer 32 are described next. The print modes of the printer 32 according to this embodiment of the invention are a normal mode and a page mode. The normal mode is a mode that prints in line units, and adjusts the line feed distance according to the character size or image height. The normal mode also has a function that executes at the line start state (the print position is at the left edge, the line buffer is empty), and this state is entered when printing starts and immediately after a line feed. The page mode is a mode that sets a print area, buffers the print data, and prints the data in a single batch. Characters and images are written to a specified print position, and are not limited by the line start state. Note that when the page mode is selected, a start page mode command is added before the image print command, and an end page mode command is added after the image print command. Note that the move print position command is enabled when the printer 32 is set to the page mode.

The command sequence of image print commands that differ according to the color mode and print mode is described next with reference to FIG. 18 to FIG. 20. FIG. 18 shows an image print command for monochrome printing. As shown in FIG. 18 (a), in the normal mode with no segments (the data length of the image print command does not exceed the specific length), an initialization command is added before the image print command. This initialization command is the same as described in the first embodiment (see FIG. 6 (a)). As in the first embodiment, a status acquisition command may be added after the image print command.

As shown in FIG. 18 (b), when in the normal mode with segments, a plurality of image print commands follow the initialization command. As shown in FIG. 18 (c), when in the page mode with no segments, a start page mode command, image print command, and end page mode command follow the initialization command. As shown in FIG. 18 (d), in the page mode with segments, the initialization command is followed by a start page mode command, the same number of move print position commands and image print commands as segments, and an end page mode command.

FIG. 19 shows image print commands for gray scale printing. For gray scale printing, the command sequence includes image print commands specifying the gray level as 50%, 25%, 12.5a, or 6.25%. Command sequences corresponding to the print mode and whether there are data segments are as shown in the figure. FIG. 20 shows image print commands for color printing. For color printing, the command sequence includes image print commands for each color, Y (yellow), M (magenta), C (cyan), K (black). Command sequences corresponding to the print mode and whether there are data segments are as shown in the figure.

FIG. 21 shows an example of print data in the fourth embodiment. As shown in the figure, the print data generation unit 72 writes the print data in XML (markup language), writes the image size and color mode as attributes of an element, and writes the image data (AAAA ... AAAA) as content of the element. Note that the image data D1 without a color mode declaration shown in the figure is an example of a program when the color mode is not specified using a specific form displayed by the web browser 27. This embodiment assumes the default monochrome printing setting when a color mode is not specified.

FIGS. 22 (b) and (c) show printouts based on the print data shown in FIG. 21. Note that the above image data (AAAA...AAAA) denotes the image file shown in FIG. 22 (a). As shown in FIG. 22 (b), images based on image data D1 and D2 are printed by a printer 32 compatible with the monochrome print command. As shown in FIG. 22 (c), images based on image data D1, D2, and D3 are printed by a printer 32 compatible with the monochrome print command and 4-bit gray scale command. The image based on image data D3 is printed in gray scale. Of the image data D1 to D6 shown in FIG. 21, only the image data corresponding to the color mode of the printer 32 is printed, and other image data is ignored.

The flow of print control in this fourth embodiment is described next with reference to the flow chart in FIG. 23. When print data is received from the host 20 (S31), the print control device 31 gets the image attribute (color mode attribute and image size attribute) and image data sets contained in the print data (S32). Based on the acquired data sets, the print control device 31 validates the image data contained in the print data (S33). As described above, image data is validated based on whether or not the data size of the image data is equal to the product of the data size per pixel in the specified color mode and the image size. If validation fails (S34 returns No), the process ends without generating a command sequence. Note that the print data could be evaluated by a markup schema before validation in S34.

If the image data is validated (S34 returns Yes), whether the data length of the image print command exceeds a specific length is determined (S35). If it does not exceed the specific length (S35 returns No), the print control device 31 generates a command sequence (print instruction command) with an initialization command added before the image print command (S36). If the data length of the image print command exceeds the specific length (S35 returns Yes), the print control device 31 segments the image data and generates a command sequence, and generates a command sequence (print instruction command) that starts with an initialization command and has a move print position command added before each image print command (S37). The generated command sequence is then sent (after S36 and S37) to the printer 32 (S38).

As described above, because the print control device 31 in this fourth embodiment of the invention converts image data having attributes specifying the color mode and image size to control commands for the printer 32 corresponding to the color mode, differences in commands that differ according to the color mode or image format can be handled by the print control device 31 even when using a host 20 that operates on a driverless platform. As a result, the application programmer can enable printing images without knowing the command system of the printer 32. In addition, because differences in color mode and image format can be absorbed by the print control device 31, plural models using different command systems can coexist as the plural printers 32. When a printer 32 is replaced, it can also be changed to a different model.

Furthermore, because the image data is validated based on the color mode and image size before generating the image print command, invalid image data can be removed and highly reliable print results can be achieved. In addition, by using markup language, command differences based on the color mode, image print command segmenting, moving the print posit ion in the page mode, and initialization commands, for example, can be concealed.

Furthermore, because the image data is segmented and plural image print commands are generated when the data length of the image print command exceeds a specific length, when a print interrupt process is executed because the printer 32 is unable to print, for example, the print interrupt process can be easily executed. For example, when the image print command contains information indicating the data length and the command system, and printing is interrupted after starting to send a long command, dummy data must be sent continuously in order to terminate that command (in order to print the specified data length), wasting time and printing paper, but this waste can be suppressed by segmenting the image data.

Note that because a printer driver is not required on the host 20, the configuration of the fourth embodiment, like the third embodiment described above, is suited to implementations using a host 20 that runs on a driverless platform. Furthermore, when the specified color mode is not compatible with the command system of the specified printer 32, this fourth embodiment ignores image data to which a color mode is added, but printing the print data containing the image data could be completely stopped.

The four embodiments described above can also be combined in various ways. For example, a pre-printing command could be generated before generating print instruction commands for strings and images as described in the third embodiment and fourth embodiment so that printing proceeds only after confirming the status of the printer 32. If the printer 32 is determined unable to print as a result of checking the status, a print interrupt process that includes sending a clear buffer command could be executed as described in the first embodiment. Yet further, by acquiring the printer 32 status in conjunction with printing as described in the first embodiment, and sending blank print data regularly or when specifically triggered as described in the second embodiment, the status can be acquired without executing a printing process.

The system configuration can also be changed as shown in FIG. 24. For example, FIG. 24 (a) shows a system configuration having a plurality of printers 32 (printers without an intelligent function) connected to an intelligent printer 30 having the print control device 31 and a printer 32 combined in a single unit. In this implementation any desired number of printers 32 (number of slave devices) can be connected to the intelligent printer 30. When such a system configuration is used in the third embodiment and fourth embodiment, printers 32 that differ by model, installed character sets, and color mode, for example, can coexist. When replacing a printer 32, the printer can also be changed to a printer of a different model, character set, or color mode.

FIG. 24 (b) shows a system configuration in which plural printers 32 are shared by plural print control devices 31. A robust printing system SY can be constructed by sharing printers 32 between redundant print control devices 31. Note that in the system configuration shown in FIG. 24 (b), print control device A and printer A, and/or print control device B and printer B, can be embodied by a single intelligent printer 30.

Components of the printing systems SY (SY1 to SY4) described in the foregoing embodiments can also be rendered as a program. The program can also be stored and supplied on a suitable recording medium (CD-ROM or flash memory, for example). More specifically, a program that causes a computer to function as parts of the printing system SY, a program that causes a computer to execute the process steps of the printing system SY, and a recording medium storing these programs, are also included in the scope of the present invention.

A receipt printer is used as an example of a printer 32 in the foregoing embodiments, but the invention can also be applied to printers other than receipt printers. The invention can also be applied to devices other than printers 32 that require status acquisition, character code conversion, or image conversion. The foregoing embodiments also use JavaScript® as an example of a scripting language, but the invention can also be used with other programming languages. Other variations are also possible without departing from the scope of the present invention.

The invention claimed is:

1. A method of controlling a printer connectable to a POS terminal configured to receive, from a server, a web page through a web browser, the method comprising following steps executed by the printer:
   (a) receiving, based on HTTP, print data written in a markup language;
   (b) obtaining, from the print data written in the markup language, image data and attributes that include a color mode and an image size;
   (c) generating, based on the print data written in the markup language, an image print command according to the color mode, without a printer driver, when a data size of the image data equals a product of (i) the data size per pixel corresponding to the color mode and (ii) the image size, and
   wherein the POS terminal generates the print data written in the markup language by executing a print control script embedded in the web page through the web browser.

2. The method of controlling a printer described in claim 1, further comprising:
   not generating, by the printer, the image print command according to the color mode, when the data size of the image data does not equal the product of (i) the data size per pixel corresponding to the color mode and (ii) the image size.

3. The method of controlling a printer described in claim 1, wherein:
   the print data written in the markup language includes (i) information indicating the color mode written in the markup language, and (ii) the image data written in the markup language.

4. The method of controlling a printer described in claim 1, wherein:
   the color mode includes 2-level monochrome or gray scale.

5. The method of controlling a printer described in claim 1, wherein:
   the color mode is set to 2-level monochrome when the color mode is not specified.

6. The method of controlling a printer described in claim 1, wherein:
   the image print command includes a color command and an image format command; and
   the color command includes at least one of a monochrome print command, a gray scale print command, or a color image print command.

7. The method of controlling a printer described in claim 6, further comprising:
   printing by the printer based on the image print command when the printer supports the color command of the image print command; and
   not printing when the printer does not support the color command of the image print command.

8. The method of controlling a printer described in claim 1, further comprising:
   adding, by the printer, an initialization command before the image print command when a data length of the image print command does not exceed a predetermined length.

9. A non-transitory computer readable medium storing a program that, when executed by a printer connectable to a POS terminal configured to receive, from a server, a web page through a web browser, causes a computer to execute steps including:
   receiving, based on HTTP, print data written in a markup language;
   obtaining, from the print data written in the markup language, image data and attributes that include a color mode and an image size;
   and
   generating, based on the print data written in the markup language, an image print command according to the color mode, without a printer driver, when a data size of the image data equals a product of (i) the data size per pixel corresponding to the color mode and (ii) the image size,
   wherein the POS terminal generates the print data written in the markup language by executing a print control script embedded in the web page through the web browser.

* * * * *